(12) United States Patent
Nguyen et al.

(10) Patent No.: US 8,507,400 B2
(45) Date of Patent: Aug. 13, 2013

(54) METHOD OF MAKING A CATALYST

(75) Inventors: Thien Duyen Thi Nguyen, Castro Valley, CA (US); Krishniah Parimi, Alamo, CA (US)

(73) Assignee: Energia Technologies, Inc., San Leandro, CA (US)

( * ) Notice: Subject to any disclaimer, the term of this patent is extended or adjusted under 35 U.S.C. 154(b) by 0 days.

(21) Appl. No.: 13/410,041

(22) Filed: Mar. 1, 2012

(65) Prior Publication Data

US 2012/0157299 A1    Jun. 21, 2012

Related U.S. Application Data

(62) Division of application No. 13/329,147, filed on Dec. 16, 2011.

(60) Provisional application No. 61/424,043, filed on Dec. 16, 2010.

(51) Int. Cl.

| | |
|---|---|
| *B01J 21/18* | (2006.01) |
| *B01J 23/00* | (2006.01) |
| *B01J 23/40* | (2006.01) |
| *B01J 23/74* | (2006.01) |
| *B05D 5/12* | (2006.01) |
| *B05D 3/04* | (2006.01) |
| *B05D 3/10* | (2006.01) |
| *B28B 19/00* | (2006.01) |
| *B29B 15/10* | (2006.01) |
| *C23C 18/00* | (2006.01) |
| *C23C 20/00* | (2006.01) |
| *C23C 24/00* | (2006.01) |
| *C23C 26/00* | (2006.01) |
| *C23C 28/00* | (2006.01) |
| *C23C 30/00* | (2006.01) |
| *H01C 17/06* | (2006.01) |
| *H05K 3/00* | (2006.01) |
| *C25D 5/16* | (2006.01) |
| *C25D 15/00* | (2006.01) |
| *C25D 3/56* | (2006.01) |
| *C25D 3/58* | (2006.01) |
| *C25D 3/46* | (2006.01) |
| *C25D 3/50* | (2006.01) |
| *C25D 3/48* | (2006.01) |

(52) U.S. Cl.
USPC .......... 502/185; 502/182; 502/184; 427/99.5; 427/304; 427/305; 205/95; 205/109; 205/238; 205/239; 205/242; 205/255; 205/257; 205/259; 205/263; 205/264; 205/265; 205/266; 205/267

(58) Field of Classification Search
USPC ................ 502/182, 184, 185; 427/99.5, 304, 427/305; 205/95, 109, 238, 239, 242, 255, 205/257, 259, 263–267
See application file for complete search history.

(56) References Cited

U.S. PATENT DOCUMENTS

| | | | |
|---|---|---|---|
| 3,007,941 A | 11/1961 | Copelin et al. | |
| 3,354,059 A | * 11/1967 | Koretzky | ........................ 205/76 |

(Continued)

FOREIGN PATENT DOCUMENTS

WO    WO2006075057    7/2006

OTHER PUBLICATIONS

"Synthesis of nickel nanoparticles supported on metal oxides using electroless plating: Controlling the dispersion and size of nickel nanoparticles," Zhijie Wu et al. Journal of Colloid and Interface Science 330 (2009), pp. 359-366.*

(Continued)

*Primary Examiner* — Patricia L Hailey
(74) *Attorney, Agent, or Firm* — Larry Williams; Williams IPS

(57) ABSTRACT

Presented are one or more aspects and/or one or more embodiments of catalysts, methods of preparation of catalyst, methods of deoxygenation, and methods of fuel production.

22 Claims, 8 Drawing Sheets

(56) References Cited

U.S. PATENT DOCUMENTS

| | | | |
|---|---|---|---|
| 3,635,761 A * | 1/1972 | Haag et al. | 427/99.5 |
| 3,753,872 A * | 8/1973 | Kohl et al. | 205/113 |
| 4,359,406 A | 11/1982 | Fung | |
| 4,415,479 A | 11/1983 | Puskas et al. | |
| 4,556,492 A | 12/1985 | Dickerson et al. | |
| 4,695,489 A * | 9/1987 | Zarnoch et al. | 427/438 |
| 4,900,618 A | 2/1990 | O'Connor et al. | |
| 5,916,840 A * | 6/1999 | Ebner et al. | 502/331 |
| 6,207,128 B1 | 3/2001 | Sellin et al. | |
| 6,761,929 B2 | 7/2004 | Damle | |
| 6,899,816 B2 * | 5/2005 | Padhi et al. | 216/52 |
| 6,956,005 B2 * | 10/2005 | Leiber | 502/185 |
| 7,314,960 B1 | 1/2008 | Lin et al. | |
| 7,329,778 B2 | 2/2008 | Morgenstern et al. | |
| 7,468,340 B2 * | 12/2008 | Ohya et al. | 502/180 |
| 7,491,858 B2 | 2/2009 | Murzin et al. | |
| 7,514,353 B2 | 4/2009 | Weidman et al. | |
| 7,569,513 B2 | 8/2009 | Schmidt | |
| 7,625,660 B2 | 12/2009 | Daimon et al. | |
| 7,842,844 B2 | 11/2010 | Atkins | |
| 8,039,682 B2 | 10/2011 | McCall et al. | |
| 2005/0009696 A1 | 1/2005 | Mao et al. | |
| 2006/0264684 A1 | 11/2006 | Petri et al. | |
| 2007/0129567 A1 | 6/2007 | Leiber et al. | |
| 2008/0154073 A1 | 6/2008 | Petri et al. | |
| 2009/0069610 A1 | 3/2009 | Roberts, IV et al. | |
| 2009/0229173 A1 | 9/2009 | Gosling | |
| 2009/0283442 A1 | 11/2009 | McCall et al. | |
| 2010/0018108 A1 | 1/2010 | Miller | |
| 2010/0130774 A1 | 5/2010 | Wan et al. | |
| 2010/0177462 A1 * | 7/2010 | Adzic et al. | 361/502 |
| 2010/0300984 A1 | 12/2010 | Kastner et al. | |
| 2011/0027169 A1 | 2/2011 | Monnier et al. | |
| 2011/0160037 A1 | 6/2011 | Youm et al. | |

OTHER PUBLICATIONS

"Optimized bath for electroless deposition of palladium on amorphous alumina membranes," Maurizio Volpe et al. Surface & Coatings Technology 200 (2006), pp. 5800-5806.*

"Hydrogenation of 3,4-epoxy-1-butene over Cu-Pd/SiO2 catalysts prepared by electroless deposition," Melanie T. Schaal et al. Catalysis Today 123 (2007), pp. 142-150.*

"Synthesis and characterization of Au-Pd/SiO2 bimetallic catalysts prepared by electroless deposition," Jayakiran Rebelli et al. Journal of Catalysis 270 (2010), pp. 224-233.*

"Chemical and electrochemical depositions of platinum group metals and their applications," Chepuri R. K. Rao et al. Coordination Chemistry Reviews 249 (2005), pp. 613-631.*

"Review on methods to deposit catalysts on structured surfaces," Valerie Mielle. Applied Catalysis A: General 315 (2006), pp. 1-17.*

"Towards an integrated ceramic micro-membrane network: Electroless-plated palladium membranes in cordierite supports," Daejin Kim et al. Journal of Membrane Science 340 (2009), pp. 109-116.*

Chia-Chu Chang and Shen-Wu Wan, Ind. Eng. Chem., vol. 39, No. 12, (1947), p. 1543.

W. F. Maier, W. Roth, I. Thies and P. V. Rague Schleyer, Chem. Ber. 115, (1982), p. 808-812.

G.R. Heal and L.L. Mkayula, Carbon, vol. 26, No. 6, (1988), p. 815-823.

J. Gusmao, D. Brodzki, G. Djega-Mariodassou, R. Frety, Catal Today, 5,(1989), p. 533.

P.A. Simonov, S.Yu. Troitskii and V.A. Likholobov, Kinetics & Catalysis, vol. 41, No. 2, (2000), p. 255-269.

I. Kubickova, M. Snare, P. Maki-Arvela , K. Eranen and D. Yu. Murgin, Catalysis Today, 106, (2005), p. 197-200.

M. Snare, I. Kubickova, P. Maki-Arvela , K. Eranen and D. Yu. Murgin, Ind. Eng. Chem. Res., 45, (2006), p. 5708-5715.

M. Snare, I. Kubickova, P. Maki-Arvela, K. Eranen and D. Yu. Murzin, Catalysis of Organic Reactions, 115, (2006), p. 415.

P. M. Maki-Arvela, I. Kubickova, M. Snare, K. Eranen and D. Yu. Murzin, Energy & Fuels, 21, (2007), p. 30-41.

M. Snare, I. Kubickova, P. Maki-Arvela, K. Eranen, J. Warna and D. Yu. Murzin, Chemical Engineering Journal, 134, (2007), p. 29-34.

M. Snare, I. Kubickova, P. Maki-Arvela, D. Chichova, K. Eranen and D. Yu. Murzin, Fuel, 87, (2008), p. 933-945.

P. M. Maki-Arvela, M. Snare, K. Eranen, J. Myllyoja and D. Yu. Murzin, Fuel, 87, (2008), p. 3543-3549.

I. Simakova, O. Simakova, P. Maki-Arvela, A. Simakova, M. Estrada and D. Yu. Murzin, Applid Catalysis A: General, 355, (2009), p. 100-108.

P. Do, M. Chiappero, L. L. Lobban and D. E. Resasco, Catal Letters 130, (2009), p. 9-18.

S. Lestari, P. Maki-Arvela, I. Simakova, J. Beltramini, G. Q. Max Lu and D. Yu. Murzin, Catal. Letters, 130, (2009), p. 48-51.

I. Simakova, O. Simakova, P. Maki-Arvela and D. Yu. Murzin, Catalysis Today, 150, (2010), p. 28-31.

Office Action mailed May 18, 2012 for U.S. Appl. No. 13/410,093, filed Mar. 1, 2012.

Office Action mailed Jun. 12, 2012 for U.S. Appl. No. 13/329,193, filed Dec. 16, 2011.

PCT International Search Report and Written Opinion of the International Searching Authority dated Aug. 22, 2012 for PCT/US2011/065620.

Office Action mailed Aug. 3, 2012 for U.S. Appl. No. 13/329,147, filed Dec. 16, 2011.

Office Action mailed Sep. 27, 2012 for U.S. Appl. No. 13/410,093, filed Mar. 1, 2012.

* cited by examiner

METHOD OF MAKING A CATALYST

CROSS-REFERENCE TO RELATED APPLICATIONS

The present application is a divisional of U.S. patent application Ser. No. 13/329,147, titled "CATALYSTS AND METHODS OF PREPARATION OF CATALYST," to Thien Duyen Thi NGUYEN and Krishniah PARIMI, filed Dec. 16, 2011 and claims benefit of U.S. Patent Application Ser. No. 61/424,043, titled "CATALYSTS, METHODS OF PREPARATION OF CATALYST, METHODS OF DEOXYGENATION, AND METHODS OF FUEL PRODUCTION," to Thien Duyen Thi NGUYEN and Krishniah PARIMI, filed Dec. 16, 2010. The present application is related to: PCT Patent Application PCT/US11/65620 titled "CATALYSTS, METHODS OF PREPARATION OF CATALYST, METHODS OF DEOXYGENATION, AND METHODS FOR FUEL PRODUCTION," to NGUYEN et al., filed Dec. 16, 2011; U.S. patent application Ser. No. 13/329,193, titled "METHODS OF DEOXYGENATION AND METHODS FOR FUEL PRODUCTION," to PARIMI et al., filed Dec. 16, 2011. The contents of all of these applications and/or patents are incorporated herein in their entirety by this reference for all purposes.

BACKGROUND

Catalysts are extensively used in a variety of industrial processes. Because of the diversity of the types of processes, there are many types of catalysts. The present inventors have made one or more discoveries pertaining to catalysts, methods of making catalysts, and methods of using catalysts.

An example of one of the areas in which these discoveries may be applicable is the use of renewable feedstocks for producing transportation fuels such as for green energy technologies that seek to use bio-oils to replace petroleum feedstock for fuels. Bio-oils are advantageous raw fuel feedstocks because they are easy to obtain and therefore enable fuel cost stabilization and provide energy autonomy. Bio-oils are a renewable resource with significant environmental benefits. First, nitrogen and sulfur organic compounds occur much less in bio-oil feedstocks as compared to petroleum fuels, so less harmful $NO_x$ & $SO_x$ emissions will be produced when biofuels are used. Second, $CO_2$ emissions during the use of biofuels is offset by the plants which need the $CO_2$ to grow, hence it is commonly referred to as carbon neutral.

There is a need for improved catalysts, improved methods of preparing catalysts, methods of deoxygenation, and/or processes for applications such as, but not limited to, the production of fuel from renewable feedstocks.

SUMMARY

One or more aspects of this invention pertains to catalysts. One aspect of the invention is a catalyst. According to one embodiment, the catalyst comprises a porous substrate and an electrolessly deposited catalytically effective metal coating having a nanoscale thickness.

Another aspect of the invention is a method of making a catalyst. According to one embodiment, the method comprises providing a porous substrate, providing a solution that comprises a metal for electroless deposition (ELD), mixing the substrate with the solution, controlling the temperature of the mixture of the substrate and the solution, and ramping the temperature while adding a reducing agent incrementally or continuously so as to cause controlled electroless deposition of the metal as a catalytically active stable nanoscale coating of the substrate.

Another aspect of the invention is a method of deoxygenation. According to one embodiment for deoxygenating oxygenated hydrocarbons, the method comprises providing a catalyst comprising a porous substrate and an electrolessly deposited catalytically effective nanoscale metal coating on the substrate and contacting the catalyst with the oxygenated hydrocarbons and hydrogen so as to accomplish hydrogenation and deoxygenation wherein the deoxygenation is accomplished preferentially by decarbonylation and decarboxylation over hydrodeoxygenation.

Another aspect of the invention is a system for producing fuel from feedstocks such as bio-oil. According to one embodiment, the system comprises a deoxygenation stage, the deoxygenation stage comprises at least one deoxygenation reactor chamber and a catalyst, and the catalyst comprises a porous substrate and an electrolessly deposited metal coating having a nanoscale thickness. The system further comprises a hydrocracking and isomerization stage comprising at least one hydrocracking and isomerization reactor and a hydrocracking and isomerization catalyst. The hydrocracking and isomerization stage is configured to receive the liquid hydrocarbons from the deoxygenation stage and hydrogen. The hydrocracking and isomerization stage operates at conditions to convert the liquid hydrocarbons from the deoxygenation stage into gasoline, diesel fuel, and/or aviation/jet fuel.

It is to be understood that the invention is not limited in its application to the details of construction and to the arrangements of the components set forth in the following description. The invention is capable of other embodiments and of being practiced and carried out in various ways. In addition, it is to be understood that the phraseology and terminology employed herein are for the purpose of description and should not be regarded as limiting.

BRIEF DESCRIPTION OF THE DRAWINGS

FIG. 1-1 is a typical Arrhenius plot for one or more embodiments of the present invention.

FIG. 1-2 is a graph showing Camelina oil composition.

FIG. 1-3 is gas chromatographic data of deoxygenated liquid product according to one or more embodiments of the present invention.

FIG. 2 is a flow diagram according to one or more embodiments of the present invention.

FIG. 3 is a flow diagram for an example according to one or more embodiments of the present invention.

Figure 1:
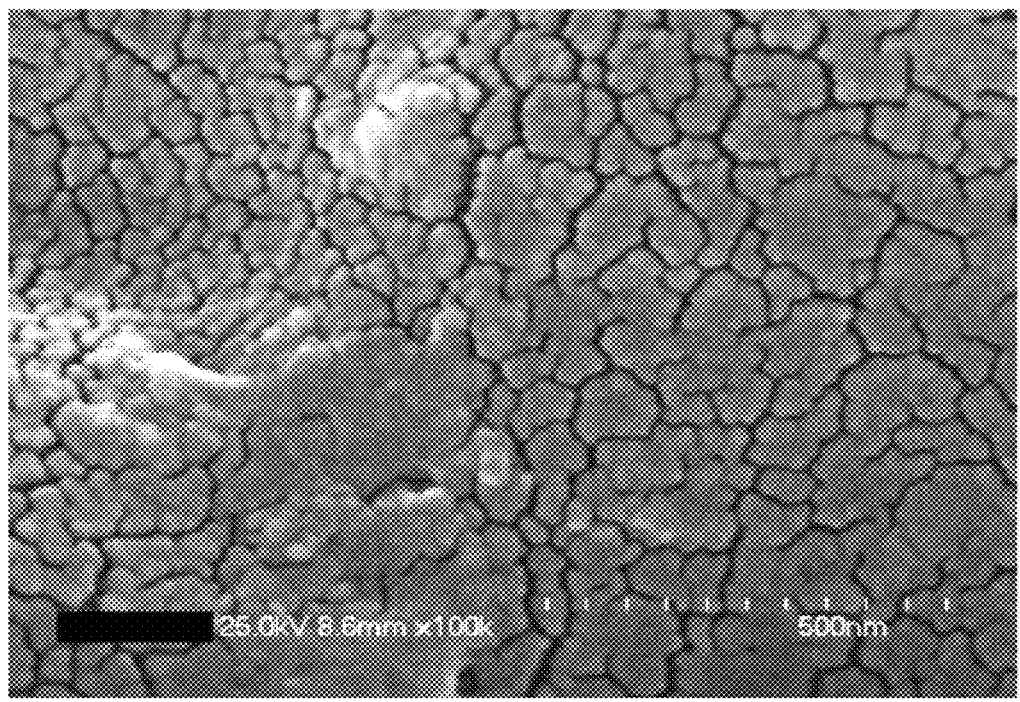
FIG. 1 is a magnified image of a catalyst according to one embodiment of the present invention.
Figure 1:
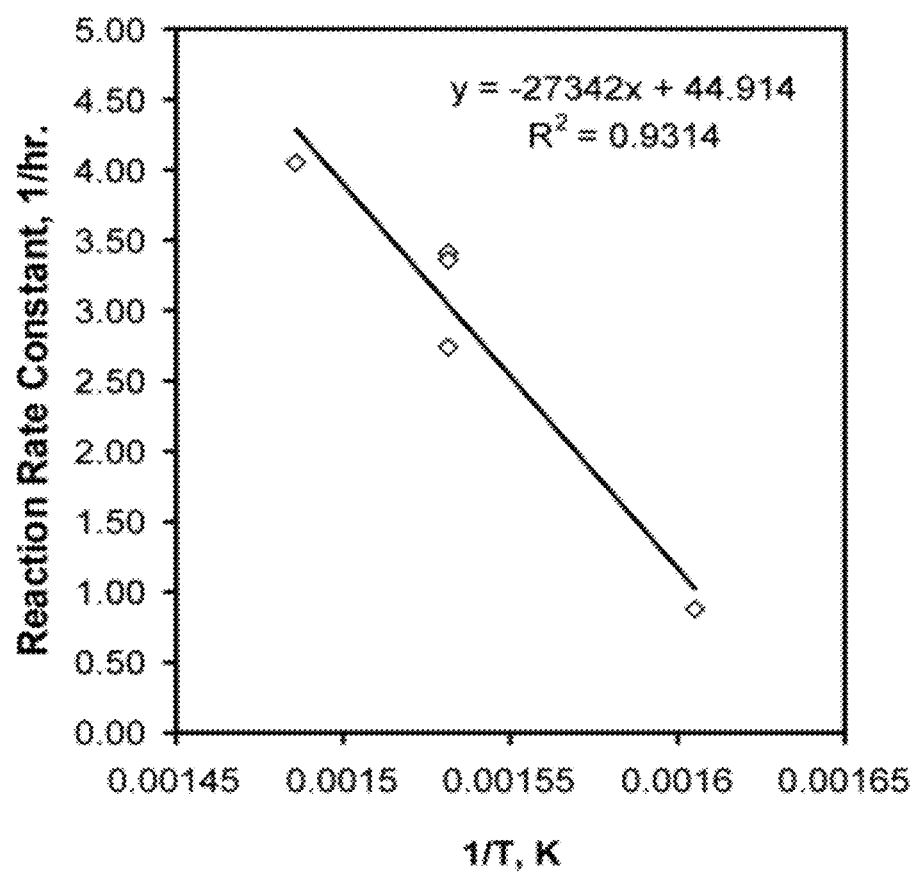

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DESCRIPTION

For the following defined terms, these definitions shall be applied, unless a different definition is given in the claims or elsewhere in this specification. All numeric values are herein defined as being modified by the term "about," whether or not explicitly indicated. The term "about" generally refers to a range of numbers that a person of ordinary skill in the art would consider equivalent to the stated value to produce substantially the same properties, function, result, etc. A numerical range indicated by a low value and a high value is defined to include all numbers subsumed within the numerical range and all subranges subsumed within the numerical range. As an example, the range 10 to 15 includes, but is not limited to, 10, 10.1, 10.47, 11, 11.75 to 12.2, 12.5, 13 to 13.8, 14, 14.025, and 15. The term "nanoscale" is defined as having at least one dimension less than 100 nanometers. The term "porous substrate" is defined as a pore structure that results in an equivalent surface area for the porous substrate in the range of 50-1500 square meters per gram ($m^2/g$) of the porous substrate as measured by a technique such as the Brunauer Emmett Teller (BET) technique or an analogous technique. In other words, the porosity of the substrate is specified by the equivalent surface area for the porous substrate.

Information about the fundamentals of electroless deposition is available in the scientific and patent literature. The following documents are incorporated herein in their entirety, for all purposes, by this reference: M. Paunovic and M. Schlesinger "Fundamentals of Electrochemical Deposition," Second Edition, John Wiley & Sons Incorporated, Pennington, N.J., 2006; and U.S. Pat. No. 7,514,353.

One aspect of the present invention encompasses a catalyst. Another aspect of the invention encompasses methods of making catalysts. Another aspect of the invention encompasses methods of using catalysts for applications such as, but not limited to, deoxygenation of compounds. Another aspect of the invention encompasses methods of making carbon-based fuels such as, but not limited to, jet fuel, gasoline, and diesel fuel using feedstocks derived from sources such as, but not limited to, plants and other renewable sources.

Catalysts

One aspect of the present invention is a catalyst such as for promoting one or more chemical reactions. Catalysts according to one or more embodiments of the present invention comprise a porous substrate and one or more metals dispersed on and/or within the substrate including surfaces forming the pores of the substrate. The metal is or can be made to be catalytically active. According to one embodiment of the present invention, the metal is an electrolessly deposited catalytically effective metal coating having a nanoscale thickness. This means that for one or more embodiments of the present invention, the metal is deposited electrochemically by electroless deposition.

According to one embodiment of the present invention, the porous substrate has a surface area equivalent of 50-1500 $m^2/g$. According to one or more other embodiments of the present invention, the porous substrate has a surface area equivalent in the range of 50-100 $m^2/g$. According to one or more other embodiments of the present invention, the porous substrate has a surface area equivalent in the range of 100-300 $m^2/g$. According to one or more other embodiments of the present invention, the porous substrate has a surface area equivalent in the range of 300-900 $m^2/g$. According to one or more other embodiments of the present invention, the porous substrate has a surface area equivalent in the range of 900-1500 $m^2/g$.

A variety of substrates can be used for one or more embodiments of the present invention. Examples of suitable substrates for embodiments of the present invention include, but are not limited to, activated carbon, carbon foam, alumina, metal foam, silica-alumina, silica, zeolites, titania, zirconia, magnesia, chromia, monoliths, or combinations thereof. Optionally, substrates for one or more embodiments of the present invention may be granular or pelletized.

According to one or more embodiments of the present invention, the substrates have low levels of impurities that could interfere with the activity of the catalysts. For example, activated carbon substrates preferably have low metal content and low ash content for some embodiments of the present invention. The impurity levels of some activated carbon can be reduced by an acid wash of the substrate prior to preparation of the catalyst.

According to one or more embodiments of the present invention, the substrate has pores 0.2 nm to 10 nm wide. According to another embodiment of the present invention, the substrate has pores 0.2 nm to 10 nm wide and the catalytic metal is present in the pores.

The catalyst is substantially stable during the preparation processes, during the activation processes if applicable, and during extended periods of use as a catalyst. For one or more embodiments of the present invention, the substrates are porous.

According to one or more embodiments of the present invention, the catalyst comprises one or more metals such as, but not limited to, palladium (Pd), nickel (Ni), chromium (Cr), molybdenum (Mo), tungsten (W), iron (Fe), ruthenium (Ru), osmium (Os), cobalt (Co), rhodium (Rh), iridium (Ir), platinum (Pt), zinc (Zn), silver (Ag), copper (Cu), gold (Au), or mixtures thereof. Optionally, the catalyst may be configured as a single metal catalyst, as a bi-metallic catalyst, or as a tri-metallic catalyst. For embodiments of the present invention that have two or more metals, optionally the metals may be mixed so that they form an alloy such as palladium and nickel in an alloy. Alternatively, the elements may be present as substantially pure elements.

According to one embodiment of the present invention, the metal comprises palladium formed as nanoscale palladium deposited on the substrate surfaces including, but not limited to, the surfaces of pores. Metals other than palladium may be used in the catalytic materials for one or more embodiments of the present invention. Substrates for one or more embodiments of the present invention include activated carbon such as coconut activated carbon.

According to one or more embodiments of the present invention, the metal is electrolessly deposited using electroless deposition processes so that the metal is substantially free of electroless deposition impurities. In one or more embodiments of the present invention, metal deposition is electroless deposition accomplished with reducing agents such as, but not limited to, hydrazine, aldehydes, carboxylic acids with up to 6 carbon atoms, or mixtures thereof. According to one embodiment of the present invention, the metal deposition is accomplished with hydrazine incrementally or continuously added during the deposition so that the reducing agent input is distributed.

According to one embodiment of the present invention, the loading of the metal is less than 15% by weight. According to another embodiment of the present invention, the loading of the metal is less than 5% by weight. According to yet another embodiment of the present invention, the loading of the metal is less than 1% by weight.

According to one or more embodiments of the present invention, the catalyst is catalytically active for deoxygenation of molecules such as oxygenated hydrocarbons. An exceptional and unexpected property of catalysts according to one or more embodiments of the present invention is that one or more of the catalysts are catalytically active for preferential deoxygenation by decarbonylation and decarboxylation over hydrodeoxygenation. Preferential deoxygenation by decarbonylation and decarboxylation over hydrodeoxygenation is defined as greater than or equal to 60% of oxygen is removed from oxygenated hydrocarbon as carbon dioxide and carbon monoxide and less than or equal to 40% of the oxygen is removed as water at all levels of deoxygenation.

According to another embodiment of the present invention, the catalyst is catalytically active so as to be capable of preferential deoxygenation by decarbonylation and decarboxylation over hydrodeoxygenation of alcohols, ethers, aldehydes, ketones, carboxylic acids, phenolics, esters, or mixtures thereof by decarbonylation and decarboxylation over hydrodeoxygenation. Catalysts according to one or more embodiments of the present invention are capable of hydrogenation and preferential deoxygenation of triglycerides by decarbonylation and decarboxylation over hydrodeoxygenation.

According to another embodiment of the present invention, the metal comprises palladium, the substrate has pores 0.2 nm to 10 nm wide with the metal present therein, and the catalyst is active for deoxygenation of triglycerides. According to another embodiment of the present invention, the catalyst is catalytically active for hydrogenation and preferential deoxygenation of triglycerides by decarbonylation and decarboxylation over hydrodeoxygenation so that the ratio of odd carbon number molecules to even carbon number molecules in the deoxygenated product is about 6:1. This ratio is typically less than one for other deoxygenation technologies.

Another embodiment of the present invention is a catalyst for deoxygenating bio-oils for fuel production. The catalyst comprises a substrate comprising activated carbon in granular form with size in the range of 0.5 mm to 3 mm. The substrate has pores 0.2 nm to 10 nm wide. The catalyst comprises an electrolessly deposited catalytically effective palladium or nickel coating having nanoscale thickness disposed on the surfaces of the pores. The palladium or nickel loading for the catalyst is less than about 2% by weight. Optionally, the metal comprises palladium grains about 15 nanometers wide.

One or more embodiments of the present invention comprises a catalyst produced by one or more of the catalyst synthesis processes provided in the present disclosure. More specifically, one or more embodiments of the present invention encompass a product by process. One or more methods of preparing catalysts, according to embodiments of the present invention, produces catalysts having unique properties such as, but not limited to, morphology, particle size, particle distribution, and chemical reactivity.

Catalysts according to one or more embodiments of the present invention can be made using the exemplary processes presented below. Catalysts according to one or more embodiments of the present invention are made using electroless deposition processes that include one or more steps such as, but not limited to, improving bath stabilization, distributing the introduction of reducing agent, and ramping the temperature of the plating bath. According to one or more embodiments of the present invention, the distributed introduction of the reducing agent is coupled with the ramping of the temperature. One or more embodiments of the present invention are the first instance of electroless deposition of nanoscale palladium coatings on activated carbon. The catalyst is stable and effective for reactions such as deoxygenation.

Prior to one or more embodiments of the present invention, the present inventors are not aware of electroless plating of palladium as having been demonstrated on granular carbon substrates or other high porosity substrates. Using electroless deposition according to one or more embodiments of the present invention, deoxygenation catalyst is produced with suitable palladium particle size and distribution in the pore structure of the substrate to enable effective deoxygenation of bio-oils at even very low metal loading. These results are exceptional and unexpected.

Catalysts produced according to one or more embodiments of the present invention have suitable palladium distribution within the pore structure of the substrate to enable high catalytic activities under low metal loading. Deposition of palladium on a substrate according to one or more embodiments of the present invention may be achievable in shorter time as compared to conventional deposition methods such as incipient wetness impregnation.

Reference is now made to FIG. 1 where there is shown a magnified image of a catalyst according to one embodiment of the present invention. The surface is magnified 100,000×. The catalyst comprises a substrate of activated carbon and a coating of electrolessly deposited palladium using an exemplary process presented below. A group of the particles was vacuum encapsulated in epoxy and then sectioned using standard metallographic materials and procedures. The resulting sectioned specimens were then examined, first by conventional scanning electron microscopy (SEM). The first examination suggested that there had been extensive penetration into and deposition of palladium. The second examination Field Emission SEM showed that almost all interior surfaces were coated with palladium. Palladium was present in islands that sometimes coalesce, but are often still discontinuous. The islands vary greatly in size, but appear to consist of grains about 15 nm across. The islands were also present on the deep interior surface of the particles.

Catalysts according to one or more embodiments of the present invention were tested. The catalyst had from 0.5% to 5% palladium loading. The catalyst showed very little effect of catalytic metal loading on deoxygenation activity (see Table 1). As shown in FIG. 1-1, the catalyst was found to be very active for deoxygenation activity with activation energy of about 54 kcal/g-mole for deoxygenation of Camelina oil. The activation energy is typical of active zeolite based hydrocracking catalysts.

For one or more embodiments of the present invention, the specific substrate-active metal combination appears to promote decarbonylation of plant oils in preference to hydrodeoxygenation in removing oxygen from the oil molecule. This is highly advantageous in process design for applications such as converting plant oils to biofuels and is an exceptional and unexpected result.

Figures 1, 2:
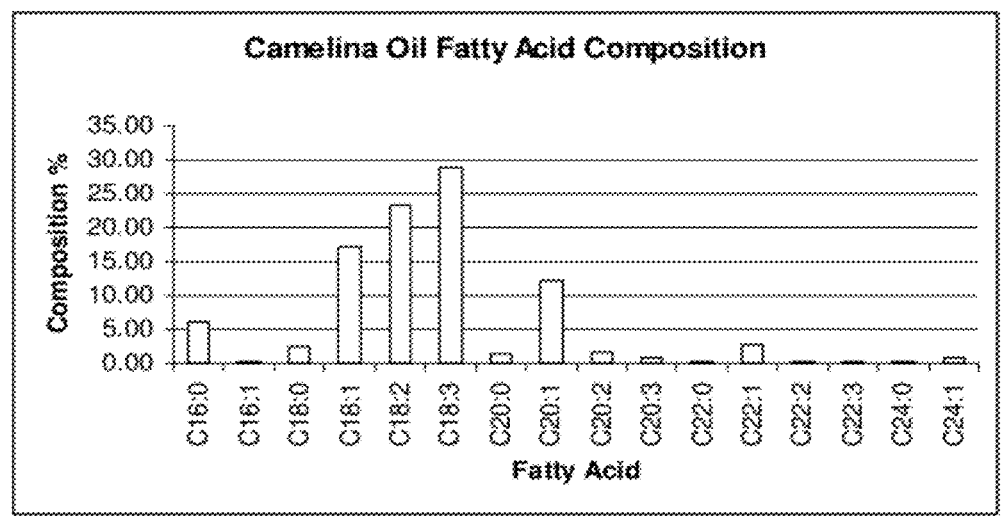
Figures 1, 2, 3:
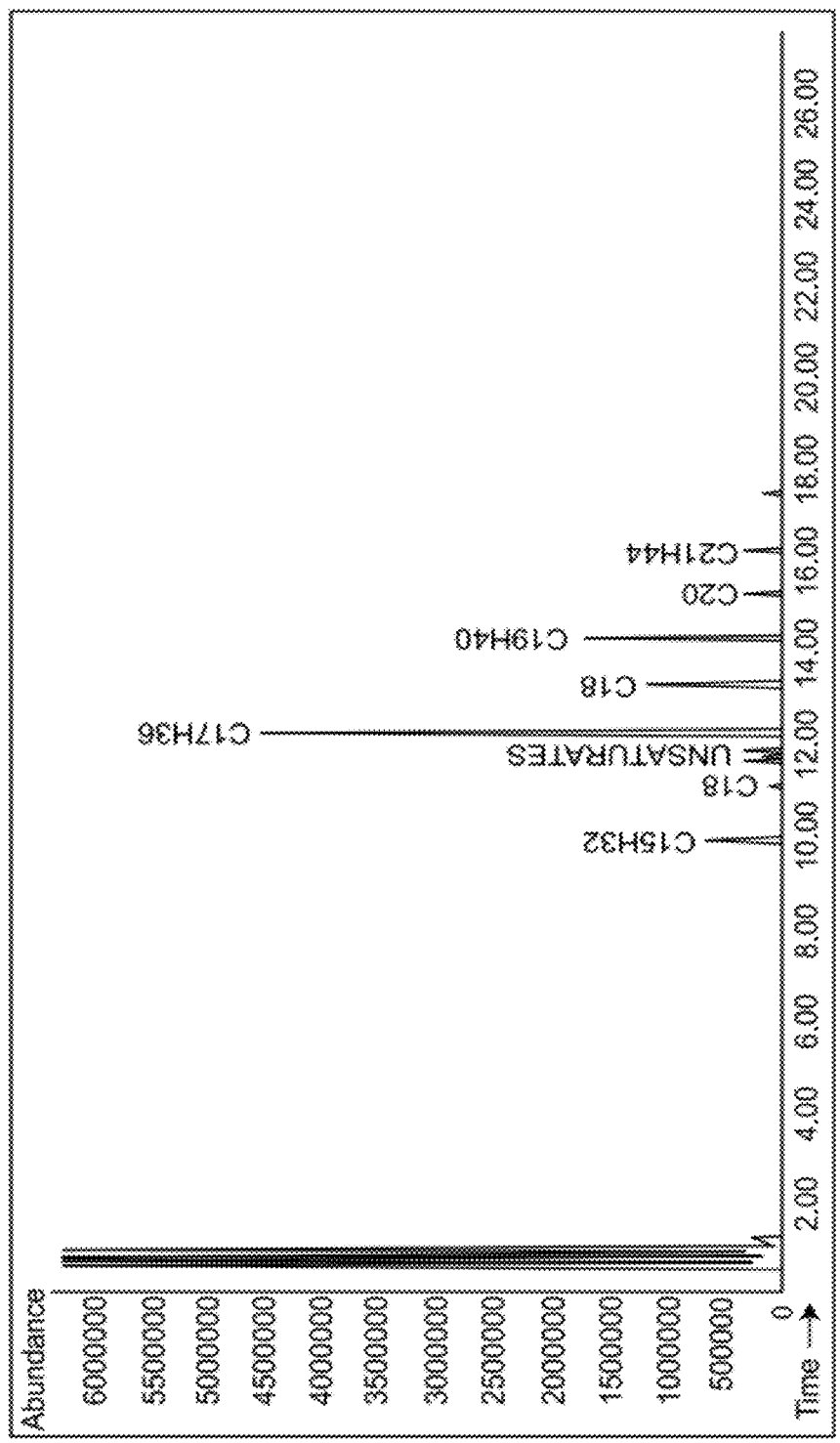
Figure 2:
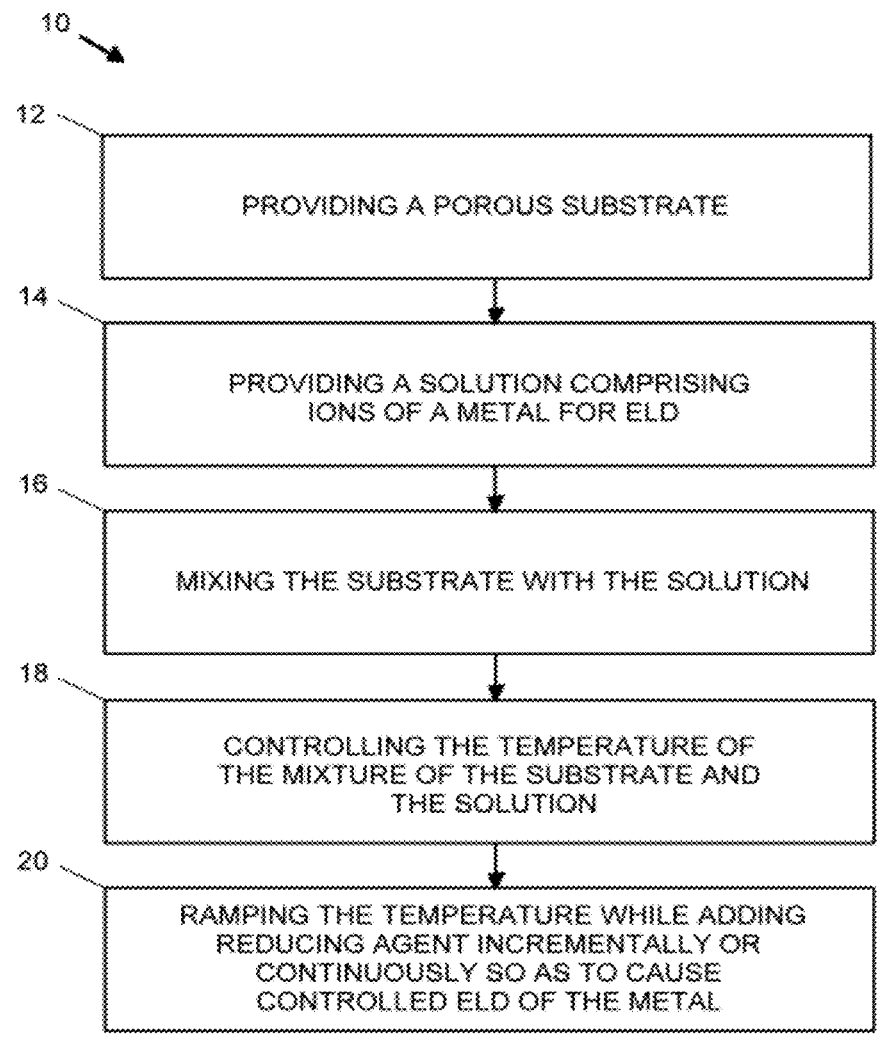
Figure 3:
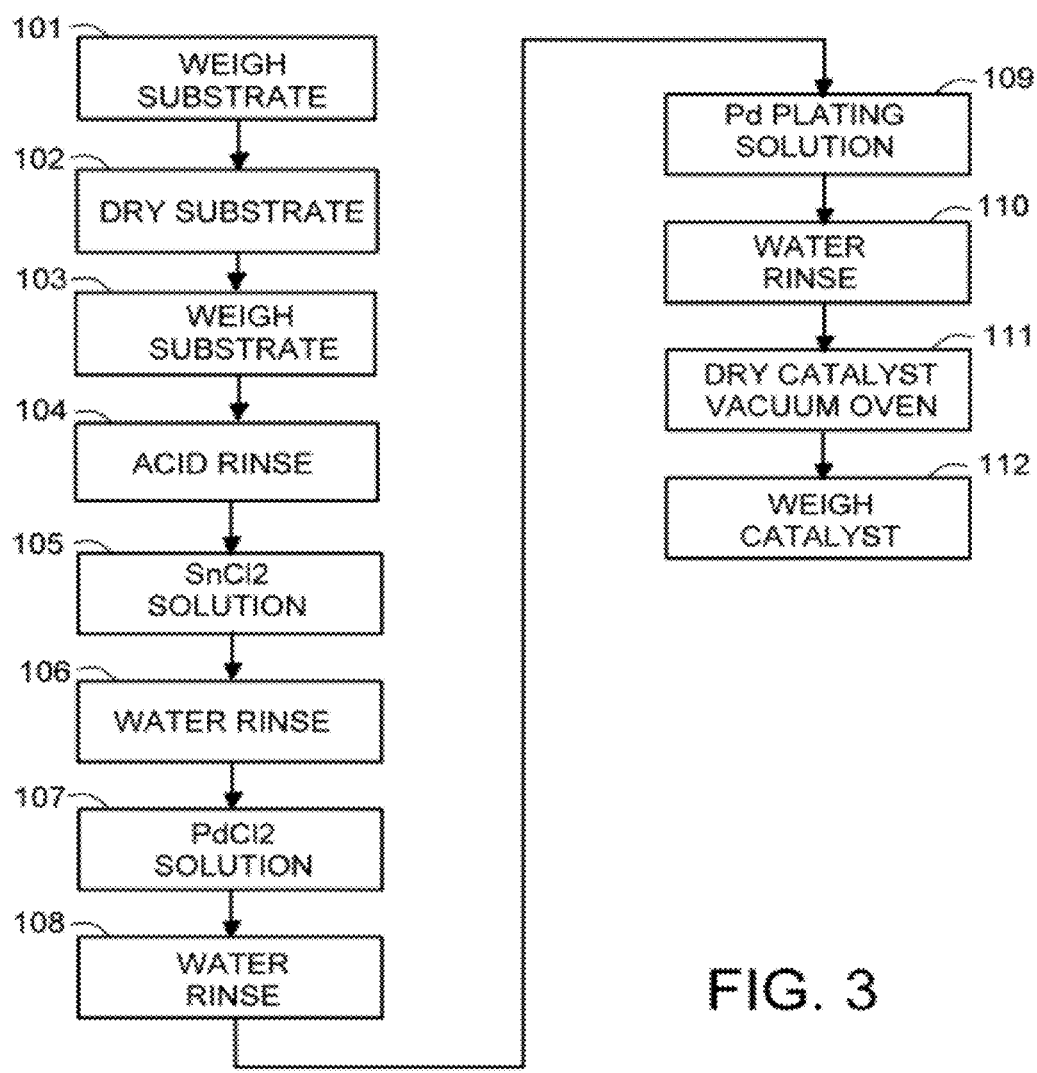

When oxygen is removed as oxides of carbon, the product molecule will have one less carbon. For example, C18 molecule will become C17. Camelina oil, as shown in FIG. 1-2, has C16, C18, C20, C22, and C24 molecules, all even numbered. FIG. 1-3 is a gas chromatograph (GC) trace showing the composition of deoxygenated product produced according to one or more embodiments of the present invention. As the gas chromatograph shows, odd number carbon atoms dominate to the extent the ratio of odd and even number atoms is about 6 to 1. In contrast to the results obtained using embodiments of the present invention, data reported for other processes show that the ratio of odd to even number carbon species is in the range from 0 to 1.

Method of Making Catalysts

Another aspect of the invention is a method of making a catalyst. Reference is now made to FIG. 2 where there is shown a flowchart for synthesis of catalysts according to one or more embodiments of the present invention. According to one embodiment, the method comprises 12 providing a porous substrate and 14 providing a solution that comprises a metal for electroless deposition. The method further comprises 16 mixing the substrate with the solution and 18 controlling the temperature of the mixture of the substrate and the solution. Also, the method comprises 20 ramping up the temperature of the mixture while adding a reducing agent incrementally or continuously so as to cause controlled electroless deposition of the metal as a catalytically active nanoscale coating of the substrate. The controlled deposition includes control of the rate of deposition of the metal and control of the location of the deposited metal. According to one or more embodiments of the present invention, the deposition rate is controlled by the distributed addition of the reducing agent in combination with the controlled ramping up of the temperature so as to allow the rate of mass transfer to allow more thorough distribution of the metal through the porous substrate for the metal deposition. According to one or more embodiments of the present invention, the reducing agent is added continuously or incrementally during most or all of the duration of the electroless deposition of the metal.

According to one embodiment of the present invention, the method includes using a porous substrate having a surface area equivalent of 50-1500 $m^2/g$. According to one or more other embodiments of the present invention, the porous substrate has a surface area equivalent in the range of 50-100 $m^2/g$. According to one or more other embodiments of the present invention, the porous substrate has a surface area equivalent in the range of 100-300 $m^2/g$. According to one or more other embodiments of the present invention, the porous substrate has a surface area equivalent in the range of 300-900 $m^2/g$. According to one or more other embodiments of the present invention, the porous substrate has a surface area equivalent in the range of 900-1500 $m^2/g$.

A variety of substrates can be used for methods of making catalysts according to one or more embodiments of the present invention. Examples of suitable substrates for embodiments of the present invention include, but are not limited to, activated carbon, carbon foam, alumina, metal foam, silica, silica-alumina, zeolites, titania, zirconia, magnesia, chromia, monoliths, or combinations thereof. Optionally, substrates for one or more embodiments of the present invention may be granular or pelletized.

According to one or more embodiments of the present invention, the method includes using a substrate having pores 0.2 nm to 10 nm wide. According to another embodiment of the present invention, the method includes depositing metal into substrate pores 0.2 nm to 10 nm wide.

According to one or more embodiments of the present invention, the method comprises electrolessly depositing one or more metals such as, but not limited to, palladium, nickel, chromium, molybdenum, tungsten, iron, ruthenium, osmium, cobalt, rhodium, iridium, platinum, zinc, silver, copper, gold, or mixtures thereof. Optionally, the catalyst may be produced as a single metal catalyst, as a bi-metallic catalyst, or as a tri-metallic catalyst. For embodiments of the present invention that have two or more metals, optionally the metals may be mixed so that they form an alloy or the elements may be present as substantially pure elements. The deposition of two or more metals may be done as co-deposition or as sequential deposition of the metals.

According to one embodiment of the present invention, the method comprises electroless deposition of palladium formed as nanoscale palladium deposited on the substrate surfaces including, but not limited to, the surfaces of pores.

According to one or more embodiments of the present invention, the metal is electrolessly deposited using electroless deposition processes so that the metal is substantially free of electroless deposition impurities. In one or more embodiments of the present invention, the method electrolessly deposited metal using reducing agents such as, but not limited to, hydrazine, aldehydes, carboxylic acids with up to 6 carbon atoms, or mixtures thereof. According to one embodiment of the present invention, the method comprises adding hydrazine incrementally or continuously during the deposition so that the reducing agent input is distributed over most or all of the duration of the deposition.

According to one embodiment of the present invention, the method includes electroless deposition to accomplish a metal loading of less than 15% by weight. According to another embodiment of the present invention, the method includes electroless deposition to accomplish a metal loading of less than 5% by weight. According to yet another embodiment of the present invention, the method includes electroless deposition to accomplish a metal loading of less than 1% by weight.

According to one or more embodiments of the present invention, the method further comprises sensitizing the substrate prior to electroless deposition such as by, but not limited to, exposing the substrate to a sensitizing solution, exposing the substrate to a solution comprising a dissolved metal, and/or exposing the substrate to a tin chloride solution.

According to one or more embodiments of the present invention, the method further comprises activating the substrate prior to electroless deposition such as by, but not limited to, exposing the substrate to an activating solution, exposing the substrate to a solution comprising a dissolved metal, and/or exposing the substrate to a palladium chloride solution.

According to one or more embodiments of the present invention, the method further comprises sensitizing the substrate prior to electroless deposition by exposing the substrate to a tin chloride solution followed by activating the substrate by exposing the substrate to a palladium chloride solution.

According to one or more embodiments of the present invention, the method uses a substrate that comprises activated carbon, carbon foam, alumina, metal foam, silica-alumina, silica, zeolites, titania, zirconia, magnesia, chromia, monoliths, or combinations thereof and electrolessly deposits metal that comprises chromium, molybdenum, tungsten, iron, ruthenium, osmium, cobalt, rhodium, iridium, platinum, zinc, copper, gold, silver, or mixtures thereof using a reducing agent that comprises hydrazine, aldehydes, carboxylic acids having 1-6 carbon atoms, or mixtures thereof.

According to one or more embodiments of the present invention, the method comprises providing a substrate that comprises granular activated carbon, exposing the substrate to a tin chloride solution so as to sensitize the activated carbon for electroless deposition, and exposing the substrate to a palladium chloride solution so as to activate the activated carbon for electroless deposition. The method also includes providing a solution of palladium for electroless deposition and mixing the substrate with the solution. The method further includes controlling the temperature of the mixture of the substrate and the solution and ramping up the temperature while adding hydrazine incrementally or continuously so as to cause controlled electroless deposition of the palladium as a catalytically active nanoscale coating of the activated carbon.

According to one or more embodiments of the present invention, the method comprises providing a substrate that comprises granular activated carbon, exposing the substrate to a tin chloride solution so as to sensitize granular activated carbon for electroless deposition, and exposing the substrate to a palladium chloride solution so as to activate the granular activated carbon for electroless deposition. The method also includes providing a solution of nickel for electroless deposition and mixing the substrate with the solution. The method further includes controlling the temperature of the mixture of the substrate and the solution and ramping up the temperature while adding hydrazine incrementally or continuously so as to cause controlled electroless deposition of the nickel as a catalytically active nanoscale coating of the granular activated carbon.

Example 1

Catalyst Preparation—Palladium on Activated Carbon

FIG. 3 shows a flowchart of the steps for preparing the catalysts of the present example. Steps 101 to 104 constitute substrate preparation and are described as follows: Step 101: 14 grams of coconut activated carbon (CAC) in granular form with size in the range of 1.6 mm to 0.8 mm were measured using an analytical balance. Step 102: The CAC was placed in aluminum weighing dish and placed in a vacuum oven. The oven temperature was raised and maintained at 125° C. The CAC was baked for 12 hours. Step 103: Nitrogen gas was vented into the vacuum oven to reach atmospheric pressure. The CAC sample was taken out of oven and immediately weighed on the analytical balance to obtain the actual weight of the CAC without moisture. Step 104: The CAC sample was placed in glass beaker with a magnetic stirrer and mixed with 50 ml of 0.2 N HCl acid for 30 minutes. The CAC sample was filtered from the acid solution.

Steps 105 to 108 constitute substrate sensitizing and activation and are described as follows: Step 105: In the sensitizing glass beaker, 125 ml of 0.2N HCl was mixed with 0.125 g $SnCl_2$ until the particles are fully dissolved using the magnetic stirrer. In the activation glass beaker, 125 ml of 0.2 N HCl was mixed with 0.01125 g $PdCl_2$ until the particles were fully dissolved using the magnetic stirrer. The CAC sample was put into the sensitizing beaker and mixed for 5 minutes. The CAC sample was filtered from the sensitizing solution. Step 106: The CAC sample was mixed in 500 ml of deionized (DI) $H_2O$ for 10 minutes. The CAC sample was filtered from the DI $H_2O$, Step 107: The CAC sample was put into the activation beaker and mixed for 5 minutes. The CAC sample was filtered from the activation solution. Step 108: The CAC sample was mixed in 500 ml of deionized (DI) $H_2O$ for 10 minutes. The CAC sample was filtered from the DI $H_2O$.

Steps 109 to 112 constitute plating of Pd on an activated carbon substrate and are described as follows: Step 109: In a glass beaker for plating solution, 70 ml of 28% $NH_4OH$, 30 ml DI $H_2O$, 0.54 g of $PdCl_2$, and 4 g $Na_2EDTA$ were mixed with a magnetic stirrer until the plating solution was fully dissolved. The temperature of the water bath of the Rotovap was raised to 40° C.; 0.1 ml of 35% $N_2H_4$ was added to the plating solution and mixed. The plating solution was combined with the CAC sample in a flask attached to the water bath in the Rotovap. The rotation was adjusted to evenly distribute the CAC in the plating solution.

After 10 minutes, one drop of $N_2H_4$ was added to the plating solution and the temperature was increased to 45° C. while the plating solution and CAC were continually mixed. After 20 minutes, one drop of $N_2H_4$ was added to the plating solution and the temperature was increased to 50° C. while the plating solution and CAC were continually mixed. After 30 minutes, the rotovap rpm was reduced to zero, the water-heating bath was turned off and the plating flask was removed.

The Pd deposited CAC was filtered from the plating solution. Step 110: The CAC sample was mixed in 500 ml of deionized (DI) $H_2O$ for 30 minutes. The Pd deposited CAC sample was filtered from the DI $H_2O$. The Pd deposited CAC sample was mixed in 500 ml of deionized DI $H_2O$ for 30 minutes. The Pd deposited CAC sample was filtered from the DI $H_2O$, Step 111: The Pd deposited CAC was placed in an aluminum weighing dish and placed in a vacuum oven. The vacuum pump was turned on and a vacuum of 25 inches of Hg was maintained in the vacuum oven. The oven temperature was raised and maintained at 125° C. The Pd deposited CAC was baked for 12 hours. Step 112: Nitrogen gas was vented into the vacuum oven until atmospheric pressure was reached. The Pd deposited CAC sample was taken out of the oven and immediately weighed on the analytical balance to obtain the actual weight of Pd deposited CAC without moisture. The weight difference between step 112 and step 103 represents the quantity of Pd deposited onto 14 grams of coconut activated carbon.

Methods of making catalysts according to one or more embodiments of the present invention may comprise using other granular, pelletized, or structured substrates derived from ceramics or metal. Methods according to one or more embodiments of the present invention may comprise using a structured substrate such as monolith or metal foam for various applications.

Example 2

Catalyst Preparation—Palladium on Alumina

Extrudated gamma-alumina substrate material was crushed using a ceramic mortar and pestle and sifted to obtain particles in the size range of 1.6 mm to 0.8 mm. An analytical balance was used to measure 14 grams of this gamma alumina substrate. The gamma alumina was baked in a vacuum oven for 12 hours and the dry weight of the gamma alumina substrate was obtained from the analytical balance. The gamma alumina was hydrated by being exposed to steam for 2 hours to minimize gamma alumina decrepitation prior to the sensitizing step.

In the sensitizing glass beaker, 125 ml of 0.2N HCl was mixed with 0.125 g $SnCl_2$ until the particles were fully dissolved using a magnetic stirrer. In the activation glass beaker, 125 ml of 0.2 N HCl was mixed with 0.01125 g $PdCl_2$ until the particles were fully dissolved using a magnetic stirrer.

The gamma alumina sample was put into a sensitizing beaker and mixed for 5 minutes. The gamma alumina sample was filtered from the sensitizing solution. The gamma alumina sample was mixed in 500 ml of DI $H_2O$ for 2 minutes. The gamma alumina sample was filtered from the DI $H_2O$. The gamma alumina sample was put into an activation beaker and mixed for 5 minutes. The gamma alumina sample was filtered from the activation solution. The gamma alumina sample was mixed in 500 ml of deionized DI $H_2O$ for 2 minutes. The gamma alumina sample was filtered from the DI $H_2O$. The gamma alumina was put back into the sensitizing beaker and mixed for 5 minutes, filtered, and rinsed in DI $H_2O$ for 2 minutes and filtered. The gamma alumina was put back into the activation beaker and mixed for 5 minutes, filtered, and rinsed in DI $H_2O$ for 2 minutes and the gamma alumina was filtered out.

In a glass beaker for plating solution, 70 ml of 28% NH4OH, 30 ml DI $H_2O$, 0.54 g of $PdCl_2$, and 4 g $Na_2EDTA$ were mixed until the plating solution was fully dissolved. The temperature of water bath of Buchi Rotovap was raised to 40° C. 0.1 ml of 35% $N_2H_4$ was added to the plating solution and mixed well. The plating solution and gamma alumina sample was combined in a flask and attached to the water bath in the Buchi Rotovap. The rotation was adjusted to evenly distribute the gamma alumina in the plating solution. After 10 minutes, one drop of $N_2H_4$ was added to the plating solution and the temperature was increased to 45° C. while the plating solution and gamma alumina were continually mixed. After 5 minutes, the rotovap rpm was reduced to zero, the water-heating bath was turned off, and the plating flask was removed. The Pd deposited gamma alumina was filtered from the plating solution.

The Pd deposited gamma alumina sample was mixed in 500 ml of deionized (Di) $H_2O$ for 10 minutes. Pd deposited gamma alumina sample was filtered from the DI $H_2O$. Pd deposited gamma alumina was placed in aluminum weighing dish and placed in a vacuum oven. The vacuum pump was turned on and a vacuum of 25 inches of Hg was maintained in the vacuum oven. The oven temperature was raised and maintained at 125° C. The Pd deposited gamma alumina was baked for 12 hours.

Nitrogen gas was vented into the vacuum oven to reach atmospheric pressure. The Pd deposited gamma alumina sample was taken out of oven and immediately weighed on the analytical balance to obtain the actual weight of the Pd deposited gamma alumina without moisture. The weight difference before and after Pd plating represents the quantity of Pd deposited onto 14 grams of gamma alumina.

Example 3

Catalyst Preparation—Nickel on Activated Carbon

Twenty-two grams of coconut activated carbon in granular form with size in the range of 1.6 mm to 0.8 mm were measured using analytical balance. The CAC was placed in aluminum weighing dish and placed in vacuum oven. The vacuum pump was turned on and a vacuum of 25 inches of Hg was maintained in the vacuum oven. The oven temperature was raised and maintained at 125° C. The CAC was baked for 12 hours. Nitrogen gas was vented into vacuum oven to reach atmospheric pressure. The CAC sample was taken out of oven and immediately weighed on the analytical balance to obtain actual weight of CAC without moisture.

The CAC sample was placed in glass beaker with a magnetic stirrer and mixed with 60 ml of 0.2 N HCl acid for 5 minutes. The CAC sample was filtered from the acid solution. The above rinse was repeated 4 more times, each time with a new 60 ml of 0.2 N HCl.

In the sensitizing glass beaker, 185 ml of 0.2N HCl was mixed with 0.375 g $SnCl_2$ until the particles were fully dissolved. In the activation glass beaker, 185 ml of 0.2 N HCl was mixed with 0.0341 g $PdCl_2$ until the particles were fully dissolved using a magnetic stirrer. The CAC sample was put into a sensitizing beaker and mixed for 5 minutes. The CAC sample was filtered from the sensitizing solution. The CAC sample was mixed in 500 ml of deionized (Di) $H_2O$ for 5 minutes. The CAC sample was filtered from the DI $H_2O$.

The CAC sample was put into an activation beaker and mixed for 5 minutes. The CAC sample was filtered from the activation solution. The CAC sample was mixed in 500 ml of deionized (DI) $H_2O$ for 10 minutes. The CAC sample was filtered from the DI $H_2O$.

In a glass beaker for plating solution, 53 ml of 28% NH4OH, 90 ml DI $H_2O$, 0.8102 g of $NiCl_2$, and 6 g $Na_2EDTA$ was mixed with a magnetic stirrer until the plating solution was fully dissolved. The temperature of a 1000 ml beaker water bath was raised to 60° C. using an IKA magnetic stirrer hot plate. 0.1 ml of 35% $N_2H_4$ was added to the plating solution and mixed well.

The CAC sample was put into a 250 ml beaker and the 250 ml beaker was suspended into the IKA controlled water bath using rubber spacers at the top of the water bath beaker. Mixing for the water bath was achieved by magnetic stirrer. Mixing for the plating beaker was achieved with an IKA overhead stirrer equipped with Teflon lined shaft and propellers (one marine propeller and one turbine propeller). The plating beaker also contained 3 Teflon baffles attached together and oriented 120 degrees apart. The plating solution was poured into a 250 ml beaker containing the CAC sample. The IKA mixer rpm was adjusted in the range of 200-400 in order to evenly distribute the CAC in plating solution.

After 10 minutes, one drop of $N_2H_4$ was added to plating solution and the temperature was increased to 65° C. while the plating solution and CAC were continually mixed. After 13 minutes, one drop of $N_2H_4$ was added to the plating solution and the temperature was increased to 70° C. while the plating solution and CAC were continually mixed. After 10 minutes, one drop of $N_2H_4$ was added to the plating solution and the temperature was increased to 75° C. while the plating solution and CAC were continually mixed. After 14 minutes, one drop of $N_2H_4$ was added to the plating solution and the temperature was increased to 79° C. while the plating solution and CAC were continually mixed. After 5 minutes, one drop of $N_2H_4$ was added to the plating solution and the temperature was increased to 79.5° C. while the plating solution and CAC were continually mixed. After 5 minutes, one drop of $N_2H_4$ was added to the plating solution and the temperature was increased to 80° C. while the plating solution and CAC were continually mixed. After 5 minutes, one drop of $N_2H_4$ was added to the plating solution and the temperature was increased to 82° C. while the plating solution and CAC were continually mixed. After 5 minutes, the rpm was reduced to zero, the water bath heating was turned off, and the plating flask was removed. The Ni deposited CAC was filtered from the plating solution.

The CAC sample was gently mixed in 100 ml of deionized (DI) $H_2O$ for 5 minutes. The Ni deposited CAC sample was filtered from the DI $H_2O$. A 100 ml water rinse was repeated as many times as necessary until the pH of the rinse solution reached 7. The Ni deposited CAC sample was filtered from the DI $H_2O$.

The Ni deposited CAC was placed in aluminum weighing dish and placed in a vacuum oven. The vacuum pump was turned on and a vacuum of 25 inches of Hg was maintained in the vacuum oven. The oven temperature was raised and maintained at 125° C. The Ni deposited CAC was baked for 12 hours.

Nitrogen gas was vented into vacuum oven to reach atmospheric pressure. The Ni deposited CAC sample was taken out of oven and immediately weighed on the analytical balance to obtain the actual weight of Ni deposited CAC without moisture. The weight difference before and after the plating step represents the quantity of Ni deposited onto 22 grams of coconut activated carbon.

Methods of Deoxygenation

Another aspect of the invention is a method of deoxygenation. Deoxygenation can occur by three mechanisms, which include hydrodeoxygenation where oxygen is mostly removed as $H_2O$, decarbonylation where oxygen is mostly removed as CO, and decarboxylation where oxygen is mostly removed as $CO_2$. Conventional hydroprocessing methods and catalyst used in deoxygenation will result in high hydrogen consumption and high water production.

One or more embodiments of the present invention comprises using one or more catalysts as described above. The selected catalyst is suitable for applications such as, but not limited to, hydrogenation, and deoxygenation of oxygenated hydrocarbons such as components of bio-oils. According to one or more embodiments of the present invention, the catalysts have properties so that there is low or minimal undesirable by-product formation. Optionally, one or more embodiments of the present invention comprises using granular catalysts with low metal loading; the catalysts are effective for reactions such as, but not limited to, hydrogenation and deoxygenation of organic materials such as, but not limited to, bio-oils. One or more embodiments of the present invention include using a reactor with the granular catalyst in a packed bed, the reactor and packed bed are arranged to operate in continuous multiphase flow mode.

According to one embodiment of the present invention for deoxygenating hydrocarbons, the method comprises providing a catalyst that comprises a porous substrate and an electrolessly deposited catalytically effective nanoscale metal coating on the substrate. The method also includes contacting the catalyst with the oxygenated hydrocarbons and hydrogen so as to accomplish hydrogenation and deoxygenation wherein the deoxygenation is accomplished preferentially by decarbonylation and decarboxylation over hydrodeoxygenation.

According to one embodiment of the present invention, the method accomplishes a ratio of decarbonylation to decarboxylation of about 6:1. In other words, the method includes generating 6 times more carbon monoxide than carbon dioxide for the deoxygenation. These results are extraordinary in comparison to the results of other processes. Others have reported that the primary removal of oxygen is by production of carbon dioxide and/or water. Unlike embodiments of the present invention, other processes appear to have low production of carbon monoxide.

The results of the present invention are even more extraordinary because the high production levels of carbon monoxide occur even with the use of palladium as the metal for the catalyst. Palladium is well known to those of ordinary skill in the art as being particularly susceptible to poisoning by carbon monoxide. Experimental results obtained using embodiments of the present invention show that the palladium catalyst maintained its catalytic activity even in the presence of carbon monoxide at partial pressures as high as 0.1 megapascals for tested periods of operation as long as 100 hours.

Deoxygenation processes according to methods of the present invention may include the use of variety of substrates for the catalyst. Examples of suitable substrates for embodiments of the present invention include, but are not limited to, activated carbon, carbon foam, alumina, metal foam, silica, silica-alumina, zeolites, titania, zirconia, magnesia, chromia, monoliths, or combinations thereof. Optionally, substrates for one or more embodiments of the present invention may be granular or pelletized.

According to one or more embodiments of the present invention, the deoxygenation process uses a substrate having pores 0.2 nm to 10 nm wide. According to another embodiment of the present invention, the substrate has pores 0.2 nm to 10 nm wide and the metal is present in the pores.

According to one or more embodiments of the present invention, the catalyst used for the deoxygenation process comprises one or more metals such as, but not limited to, palladium, nickel, chromium, molybdenum, tungsten, iron, ruthenium, osmium, cobalt, rhodium, iridium, platinum, zinc, silver, copper, gold, or mixtures thereof. Optionally, the catalyst may be configured as a single metal catalyst, as a bi-metallic catalyst, or as a tri-metallic catalyst. For embodiments of the present invention that have two or more metals, optionally the metals may be mixed so that they form an alloy or the elements may be present as substantially pure elements.

According to one embodiment of the present invention, the metal comprises palladium formed as nanoscale palladium deposited on the substrate surfaces including, but not limited to, the surfaces of pores. Metals other than palladium may be used in the catalytic materials for one or more embodiments of the present invention. Substrates for one or more embodiments of the present invention include activated carbon such as coconut activated carbon.

According to one or more embodiments of the present invention, the metal is electrolessly deposited using electroless deposition processes so that the metal is substantially free of electroless deposition impurities. In one or more embodiments of the present invention, metal deposition is electroless deposition accomplished with reducing agents such as, but not limited to, hydrazine, aldehydes, carboxylic acids with up to 6 carbon atoms, or mixtures thereof. According to one embodiment of the present invention, the metal deposition is accomplished with hydrazine incrementally or continuously added during the deposition so that the reducing agent input is distributed.

According to one embodiment of the present invention, the loading of the metal is less than 15% by weight. According to another embodiment of the present invention, the loading of the metal is less than 5% by weight. According to yet another embodiment of the present invention, the loading of the metal is less than 1% by weight.

According to one or more embodiments of the present invention, the catalyst is catalytically active for deoxygenation of molecules such as oxygenated hydrocarbons. An exceptional and unexpected property of catalyst according to one or more embodiments of the present invention is that the catalyst is catalytically active for preferential deoxygenation by decarbonylation and decarboxylation over hydrodeoxygenation. Preferential deoxygenation by decarbonylation and decarboxylation over hydrodeoxygenation is defined as greater than or equal to 60% of oxygen is removed from oxygenated hydrocarbon as carbon dioxide and carbon monoxide and less than or equal to 40% of the oxygen is removed as water.

According to another embodiment of the present invention, the catalyst is catalytically active so as to be capable of preferential deoxygenation by decarbonylation and decarboxylation over hydrodeoxygenation of alcohols, ethers, aldehydes, ketones, carboxylic acids, phenolics, esters, or mixtures thereof by decarbonylation and decarboxylation over hydrodeoxygenation. Catalysts, according to one or more embodiments of the present invention, are capable of hydrogenation and preferential deoxygenation of triglycerides by decarbonylation and decarboxylation over hydrodeoxygenation.

According to another embodiment of the present invention, the activation energy for deoxygenation is about 54 kcal/g-mole for Camelina oil. According to another embodiment of the present invention, the metal comprises palladium, the substrate has pores 0.2 nm to 10 nm wide with the metal present therein, and the catalyst is active for deoxygenation of triglycerides. According to another embodiment of the present invention, the catalyst is catalytically active for hydrogenation and preferential deoxygenation of triglycerides by decarbonylation and decarboxylation over hydrodeoxygenation so that the ratio of odd carbon number molecules to even carbon number molecules in the deoxygenated product is about 6:1.

Another embodiment of the present invention is a catalyst for deoxygenating bio-oils for fuel production. The catalyst comprises a substrate comprising activated carbon in granular form with size in the range of 0.5 mm to 3 mm. The substrate has pores 0.2 nm to 10 nm wide. The catalyst comprises an electrolessly deposited catalytically effective palladium or nickel coating having nanoscale thickness disposed on the surfaces of the pores. The palladium or nickel loading for the catalyst is less than about 2% by weight. Optionally, the metal comprises palladium grains about 15 nanometers wide.

According to another embodiment of the present invention, the metal coating of the catalyst is palladium and the method of deoxygenation is performed with the catalyst exposed to carbon monoxide partial pressure up to about 0.1 megapascals. As an option for one or more embodiments of the present invention, the oxygenated hydrocarbons comprise triglycerides, the substrate is activated carbon, and the metal comprises palladium. The method further includes contacting the catalyst with the oxygenated hydrocarbons and hydrogen so as to preferentially accomplish deoxygenation by decarbonylation and decarboxylation over hydrodeoxygenation. The deoxygenation is accomplished at temperatures in the range 300° C. to 400° C. and pressures in the range 1.5 megapascals to 15 megapascals.

A method of deoxygenation according to another embodiment of the present invention, the hydrocarbons comprise triglycerides, the substrate comprises activated carbon, carbon foam, alumina, metal foam, silica-alumina, silica, zeolites, titania, zirconia, magnesia, chromia, monoliths, or combinations thereof. The metal is selected from the group consisting of chromium, molybdenum, tungsten, iron, ruthenium, osmium, cobalt, nickel, rhodium, iridium, palladium, platinum, zinc, gold, silver, copper, or mixtures thereof, and contacting the catalyst with the oxygenated hydrocarbons and hydrogen so as to preferentially accomplish deoxygenation by decarbonylation and decarboxylation over hydrodeoxygenation is accomplished at temperatures in the range 300° C. to 400° C. and pressures in the range 1.5 megapascals to 15 megapascals. Optionally, the catalyst has a metal loading of less than or equal to about 2% with deoxygenation efficiency greater than about 90% or the catalyst has a metal loading of less than or equal to about 1% with deoxygenation efficiency greater than about 90%. For one or more embodiments of the present invention, the method includes using a weight hourly space velocity of 0.2 to 2.5. The weight hourly space velocity is calculated as the mass flow rate of the feed divided by the mass of catalyst.

Example 4

Deoxygenation Using Palladium on Activated Carbon

Using methods according to one or more embodiments of the present invention, catalysts were made with different Pd metal loading on coconut activated carbon. The catalysts were placed in a packed bed reactor with the same operating parameters processing Camelina oil in continuous multiphase flow mode. The results that were obtained were exceptional and unexpected with respect to the low metal loading and high percentage of deoxygenation. Table 1 shows that high deoxygenation can be achieved at low metal loading:

TABLE 1

| Palladium Loading (wt %) | Deoxygenation (%) |
| --- | --- |
| 0.5 | 86 |
| 1.2 | 91 |
| 3.0 | 87 |
| 5.2 | 84 |

In another experiment using catalysts according to one or more embodiments of the present invention, catalysts with average metal loading of 5 weight % was made and loaded into a packed bed reactor to process Camelina oil in continuous operation for 100 operating hours. Sustained deoxygenation activity was observed over the duration of the continuous operation.

Palladium catalyst prepared according to one or more embodiments of the present invention may have significant cost advantages that can be gained by using lower metal loading to carry out deoxygenation of bio-oils. Catalysts according to one or more embodiments of the present invention, when used to carry out deoxygenation reaction, did not show any plugging or coking issues throughout a 500-hour continuous run in a packed bed reactor. Catalysts according to one or more embodiments of the present invention achieve deoxygenation primarily through decarbonylation chemistry as evident by CO content in reactor gas outlet composition.

Experimental work was done using a continuous flow fixed bed reactor according to one or more embodiments of the present invention. The reactor was a 0.305 inch internal diameter, 10 inch long reactor with pre-heat and post-heat zones. Reactor volume was 12 cc with a catalyst weight of 6.13 g. Experiments were done and results were obtained for a range of conditions. Some of the parameters varied were temperature, pressure, and space velocity. Ranges covered and results were:

Temperature range 300-400 C
Pressure 250-1000 psig
Weight Hourly Space Velocity (WHSV) 0.5 to 2.5
Conversion 20-95%

Methods of deoxygenation according to one or more embodiments of the present invention comprise using palladium catalyst material finely dispersed on activated carbon which may be prepared as described above. According to one or more embodiments, the method uses the fine pore structure of the activated carbon. The method uses relatively higher temperatures to effectively hydrogenate and split feed molecules so that the fragments have easy access to the fine pore structure of the substrate.

The inventors have also used one or more embodiments of the present invention in test for 100 hours of continuous flow operation for deoxygenation of Camelina oil and showed that sustained catalyst activity was achieved under smooth reactor operation with no evidence of plugging or coking. In contrast, other deoxygenation technologies have been reported to produce high contents of aromatics and unsaturates resulting in coking and plugging of the deoxygenating reactor in continuous flow operating mode.

The method of preparing the catalysts, such as the method described above, allows penetration of nanocrystalline palladium into micropores of 0.4 to 2 nanometers. Small pore volume offers the most surface area for reactions. Methods according to one or more embodiments of the present invention have shown that large concentration of palladium is not needed in the catalysts, which is a result that is unexpected and exceptional and may be the result of having deposited the palladium perhaps substantially as a nanoscale coating.

As stated above, catalysts having from 0.5% to 5% palladium loading were tested. The catalyst showed very little effect of catalytic metal loading on deoxygenation activity (see Table 1). For one or more embodiments of the present invention, the specific substrate-active metal combination appears to promote decarbonylation of oils, such as plant oils, in preference to hydrodeoxygenation in removing oxygen from the oil molecule. This is highly advantageous in process design for applications such as converting plant oils to biofuels and is an exceptional and unexpected result.

When oxygen is removed as oxides of carbon, the product molecule will have one less carbon. For example, C18 molecule will become C17. The feed molecule as shown in FIG. 1-2 has C16, C18, C20, C22, and C24 molecules, all even numbered. FIG. 1-3 is a gas chromatograph trace showing the composition of deoxygenated product produced according to one or more embodiments of the present invention. As the gas chromatograph shows, odd number carbon atoms dominate to the extent the ratio of odd and even number atoms is about 6 to 1. In contrast to the results obtained using embodiments of the present invention, data reported for other processes show that the ratio of odd to even number carbon species is in the range from 0 to 1.

As hydrodeoxygenation is suppressed, hydrogen consumption will be minimized and less water will be made in the reactor. High hydrogen consumption adversely affects the operating cost of the plant and it also puts a new demand on hydrogen in an existing refinery. Most refineries lack adequate supply of hydrogen and building new hydrogen plant for retrofit are usually cost prohibitive. In such situations, a process that doesn't consume large quantities of hydrogen offers great economic and logistic advantages to a refiner planning to produce biofuels with existing refinery infrastructure.

Another drawback of a process that consumes considerable amounts of hydrogen is reactor temperature control. Hydrogen, when consumed, releases a significant amount of heat and this has to be efficiently removed for safety and proper operation of the plant.

One or more embodiments of the present invention result in about 60-65% of oxygen removed as oxides of carbon with only about one third going to make water. This is an unexpected and extraordinary result for one or more embodiments of the present invention.

One or more embodiments of the present invention comprises using a reactor space velocity that may be higher than in a typical hydroprocessing unit commonly used in petroleum refining. Processes according to one or more embodiments of the present invention use modest temperatures and modest hydrogen pressure. According to one embodiment of the present invention, the process includes using a conventional downflow fixed bed reactor. The option to use a fixed bed reactor makes the process easy to scale-up. Preferred embodiments of the present invention do not use a solvent during deoxygenation processes.

Example 5

Deoxygenation Using Palladium on Alumina Catalyst

Refined Camelina oil was the feedstock used in a deoxygenation reactor according to one or more embodiments of the present invention. Deoxygenation experiments were carried out in a continuous down-flow multiphase packed bed reactor. In this example, 6.1 grams of 0.5 wt % Pd on gamma alumina catalyst according to one or more embodiments of the present invention was loaded into a stainless steel reactor. The reactor was 0.305 inches in internal diameter and 10 inches in length with pre-heat and post-heat zones. The reactor volume was 12 cc. Heat for the reactor was supplied by a 3-zone temperature controlled furnace with heat equalizing blocks. Camelina oil feed was pumped at a 0.1 cc/min rate into the reactor. Liquid and gaseous products exiting the reactor were collected in a separator. Backpressure regulators maintained operating system pressure at 500 psig. The Pd on gamma alumina catalyst was reduced under hydrogen at 250° C. for 2 hours to activate the catalyst. Reactor temperature was raised from 250° C. to 350° C. within 60 minutes. Liquid Camelina oil feed was then pumped into the reactor at a 0.1 cc/min rate. Hydrogen gas feed rate into the reactor was 70 cc/min. The reactor temperature was maintained at 350° C. and the reactor was run for 10 hours. The reactor gas product was analyzed using a gas chromatograph. The major reactant gaseous product observed other than $H_2$ was CO. Paraffinic wax product was separated from water by gravity. Elemental analysis was performed on the parrafinic wax product to determine the oxygen content of deoxygenated product. Oxygen elemental analysis showed approximately 96% of oxygen had been removed from the original Camelina oil feed.

Example 6

Deoxygenation Using Nickel on Activated Carbon Catalyst

Refined Camelina oil was the feedstock used in deoxygenation micro unit according to one or more embodiments of the present invention. Deoxygenation experiments were carried out in a continuous down-flow multiphase packed bed reactor. In this example, 6.1 grams of 0.9 wt % Ni on activated carbon catalyst according to one or more embodiments of the present invention was loaded into a stainless steel reactor. The reactor was 0.305 inches in internal diameter and 10 inches in length with pre-heat and post-heat zones. The reactor volume was 12 cc. Heat for the reactor was supplied by a three-zone temperature controlled furnace with heat equalizing blocks. Liquid and gaseous products exiting the reactor were collected in a separator. Backpressure regulators maintained operating system pressure at 1000 psig. The Ni on the activated carbon catalyst was reduced under hydrogen at 250° C. for 2 hours to activate the catalyst. The Ni catalyst was used in bare metal form instead of as a sulfide form that is typical for the hypro-processing industry. Reactor temperature was raised from 250° C. to 360° C. within 60 minutes. Liquid Camelina oil feed was then pumped into the reactor at a 0.1 cc/min rate. The hydrogen gas feed rate into the reactor was 168 cc/min. Reactor temperature was maintained at 360° C. and the reactor was run for 13 hours. Reactor gas product was analyzed using a gas chromatograph. The major reactant gaseous product observed other than $H_2$ was CO. Paraffinic wax product was separated from water by gravity. Elemental analysis was performed on the parrafinic wax product to determine the oxygen content of deoxygenated product. Oxygen elemental analysis showed approximately 87% of oxygen had been removed from the original Camelina oil feed.

Catalysts according to one or more embodiments of the present invention promote decarbonylation and decarboxylation rather than hydrodeoxygenation. The process consumes considerably less hydrogen for one or more possible benefits such as, but not limited to, favorable process economics, use of existing refinery infrastructure to produce synthetic biofuels, and easier reactor design. Furthermore, one or more processes according to embodiments of the present invention comprises a high yield of distillate fuels with low or minimal production of undesired by-products. Deoxygenation reactors according to embodiments of the present invention comprise one or more of multiphase downflow packed bed configuration, continuous flow operation capability, and the absence of extraneous or process derived solvents or diluents.

Methods of Fuel Production

A part of the process of producing synthetic biofuels from biosources is deoxygenation. Deoxygenation can occur by three mechanisms, which include hydrodeoxygenation where oxygen is mostly removed as $H_2O$, decarbonylation to where oxygen is mostly removed as CO, and decarboxylation where oxygen is mostly removed as $CO_2$. In other words, the processing of bio-oils which have a different chemistry than conventional petroleum oils have one or more problems that are overcome by one or more embodiments of the present invention.

Although embodiments of the present invention can efficiently convert any type of bio-oils and/or other suitable feedstocks, one or more of the following examples provide data for deoxygenation of non-edible bio-oils. Examples of nonedible bio-oils include Tung, Jojoba, Jatropha, Camelina sativa, Tall, Crambe, Castor, Industrial Rapeseed, Cuphea, Lesquerella, and others. Advancements in genetics engineering offer the possibilities for bio-oils to be extracted from oil seed crops that are hardy, drought tolerant, pest resistant, and can be grown on marginal soil to provide high oil weight content. Alternatively, bio-oils can also be extracted from algae and other genetically engineered biological systems. Estimated bio-oil content from these sources can range from 25 wt % to 50 wt %.

Figure 4:
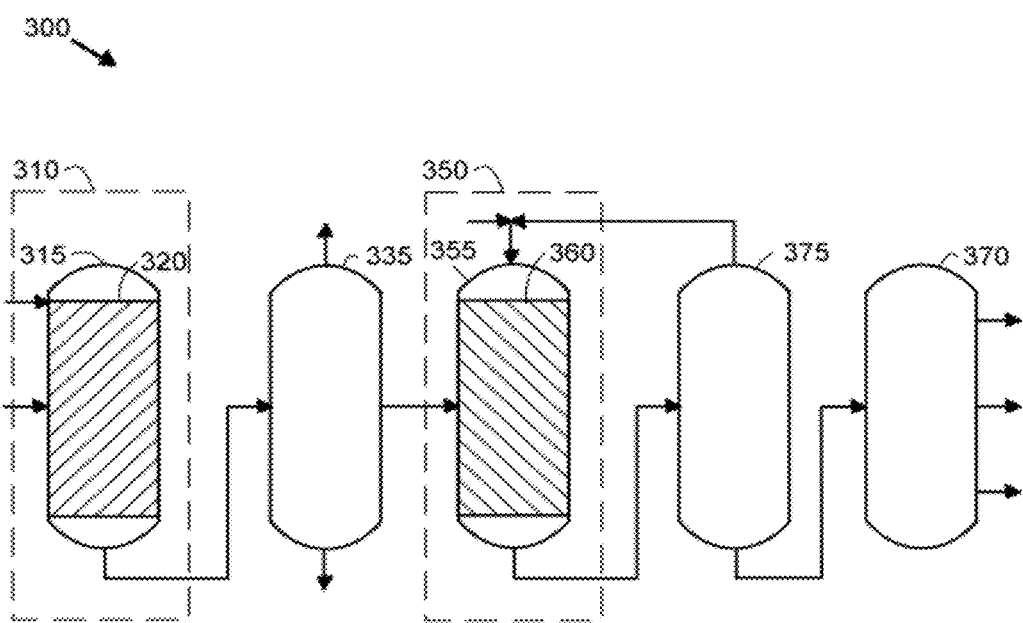
FIG. 4 is a flow diagram according to one or more embodiments of the present invention.

Reference is now made to FIG. 4 where there is shown a schematic diagram of a system 300 for producing fuels such as gasoline, diesel fuel, and jet fuel from sources such as, but not limited to, renewable feedstocks. System 300 comprises a deoxygenation stage 310 which comprises at least one deoxygenation reactor chamber 315 and a catalyst 320 contained in the deoxygenation reactor chamber 315. Catalyst 320 comprises a porous substrate and an electrolessly deposited metal coating having a nanoscale thickness. Catalyst 320 according to one or more embodiments of the present invention is essentially the same as catalysts described earlier in the present disclosure. As an option for one or more embodiments of the present invention, at least one deoxygenation reactor chamber 315 and the catalyst 320 are configured as a packed bed reactor to operate in continuous multiphase flow mode with hydrogen as a reactant.

According to one embodiment of the present invention, the porous substrate of catalyst 320 has a surface area equivalent of 50-1500 $m^2/g$. According to one or more other embodiments of the present invention, the porous substrate of catalyst 320 has a surface area equivalent in the range of 50-100 $m^2/g$. According to one or more other embodiments of the present invention, the porous substrate of catalyst 320 has a surface area equivalent in the range of 100-300 $m^2/g$. According to one or more other embodiments of the present invention, the porous substrate of catalyst 320 has a surface area equivalent in the range of 300-900 $m^2/g$. According to one or more other embodiments of the present invention, the porous substrate of catalyst 320 has a surface area equivalent in the range of 900-1500 $m^2/g$.

A variety of substrates can be used for catalyst 320. Examples of suitable substrates for catalyst 320 include, but are not limited to, activated carbon, carbon foam, alumina, metal foam, silica, silica-alumina, zeolites, titania, zirconia, magnesia, chromia, monoliths, or combinations thereof. Optionally, substrates catalysts 320 may be granular or pelletized.

According to one or more embodiments of the present invention, the substrate of catalyst 320 has pores 0.2 nm to 10 nm wide. According to another embodiment of the present invention, the substrate of catalyst 320 has pores 0.2 nm to 10 nm wide and the metal is present in the pores.

According to one or more embodiments of the present invention, catalyst 320 comprises one or more metals such as, but not limited to, palladium (Pd), nickel (Ni), chromium (Cr), molybdenum (Mo), tungsten (W), iron (Fe), ruthenium (Ru), osmium (Os), cobalt (Co), rhodium (Rh), iridium (Ir), platinum (Pt), zinc (Zn), silver (Ag), copper (Cu), gold (Au), or mixtures thereof. Optionally, catalyst 320 may be configured as a single metal catalyst, as a bi-metallic catalyst, or as a tri-metallic catalyst. For embodiments of the present invention that have two or more metals, optionally the metals may be mixed so that they form an alloy such as palladium and nickel in an alloy. Alternatively, the elements may be present as substantially pure elements.

According to one embodiment of the present invention, the metal comprises palladium formed as nanoscale palladium deposited on the substrate surfaces including, but not limited to, the surfaces of pores. Metals other than palladium may be used in the catalytic materials for one or more embodiments of the present invention. Substrates for one or more embodiments of the present invention include activated carbon such as coconut activated carbon.

According to one or more embodiments of the present invention, the metal is electrolessly deposited using electroless deposition processes so that the metal is substantially free of electroless deposition impurities. In one or more embodiments of the present invention, metal deposition is electroless deposition accomplished with reducing agents such as, but not limited to, hydrazine, aldehydes, carboxylic acids with up to 6 carbon atoms, or mixtures thereof. According to one embodiment of the present invention, the metal deposition is accomplished with hydrazine incrementally or continuously added during the deposition so that the reducing agent input is distributed.

According to one embodiment of the present invention, the loading of the metal is less than 15% by weight. According to another embodiment of the present invention, the loading of the metal is less than 5% by weight. According to yet another embodiment of the present invention, the loading of the metal is less than 1% by weight.

According to one or more embodiments of the present invention, catalyst 320 is catalytically active for deoxygenation of molecules such as oxygenated hydrocarbons. An exceptional and unexpected property of catalyst 320 according to one or more embodiments of the present invention is that the catalyst is catalytically active for preferential deoxygenation by decarbonylation and decarboxylation over hydrodeoxygenation. Preferential deoxygenation by decarbonylation and decarboxylation over hydrodeoxygenation is defined as greater than or equal to 60% of oxygen is removed from oxygenated hydrocarbon as carbon dioxide and carbon monoxide and less than or equal to 40% of the oxygen is removed as water.

According to another embodiment of the present invention, catalyst 320 is catalytically active so as to be capable of preferential deoxygenation by decarbonylation and decarboxylation over hydrodeoxygenation of alcohols, ethers, aldehydes, ketones, carboxylic acids, phenolics, esters, or mixtures thereof by decarbonylation and decarboxylation over hydrodeoxygenation. Catalyst 320 according to one or more embodiments of the present invention is capable of hydrogenation and preferential deoxygenation of triglycerides by decarbonylation and decarboxylation over hydrodeoxygenation.

According to another embodiment of the present invention, the activation energy for deoxygenation is about 54 kcal/g-mole for Camelina oil when using catalysts 320. According to another embodiment of the present invention, the metal of catalyst 320 comprises palladium, the substrate has pores 0.2 nm to 10 nm wide with the metal present therein, and the catalyst is active for deoxygenation of triglycerides. According to another embodiment of the present invention, catalyst 320 is catalytically active for hydrogenation and preferential deoxygenation of triglycerides by decarbonylation and decarboxylation over hydrodeoxygenation so that the ratio of odd carbon number molecules to even carbon number molecules in the deoxygenated product is about 6:1.

Another embodiment of the present invention is a catalyst for deoxygenating bio-oils for fuel production. Catalyst 320 comprises a substrate comprising activated carbon in granular form with size in the range of 0.5 mm to 3 mm. The substrate has pores 0.2 nm to 10 nm wide. Catalyst 320 comprises an electrolessly deposited catalytically effective palladium or nickel coating having nanoscale thickness disposed on the surfaces of the pores. The palladium or nickel loading for catalyst 320 is less than about 2% by weight. Optionally, catalyst 320 comprises palladium grains about 15 nanometers wide.

As an option for one or more embodiments of the present invention, system 300 further comprises a three-phase separator configured to receive effluent from deoxygenation stage 310 and to separate water, liquid hydrocarbons, and gases from the effluent into separate streams.

According to one or more embodiments of the present invention, system 300 further comprises a hydrocracking and isomerization stage 350 comprising at least one hydrocracking and isomerization reactor 355 and a hydrocracking and isomerization catalyst 360. Hydrocracking and isomerization stage 350 is configured to receive the liquid hydrocarbons from deoxygenation stage 310 and hydrogen. Hydrocracking and isomerization stage 350 operates at conditions to convert the liquid hydrocarbons from deoxygenation stage 310 into gasoline, diesel fuel, and/or aviation/jet fuel. More specifically, hydrocracking and isomerization stage 350 is configured to operate at temperatures and pressures to accomplish converting the hydrocarbons into the fuels. Hydrocracking and isomerization catalyst 360 may be one or more commercially available catalyst for hydrocracking and isomerization.

According to one or more embodiments of the present invention, deoxygenation stage 310 comprises two or more deoxygenation reactor chambers 315 each containing catalyst 320. The two or more deoxygenation reactor chambers 315 are connected in series (not shown in FIG. 4).

According to one or more embodiments of the present invention, deoxygenation stage 310 comprises two or more deoxygenation reactor chambers 315 each containing catalyst 320 or a mixture of catalysts. The two or more deoxygenation reactor chambers 315 are connected in series and system 300 further comprises a separator system to remove carbon monoxide, light gases, carbon dioxide, and water from the effluent stream connecting the two or more deoxygenation reactor chambers 315 between the two or more deoxygenation reaction chambers (additional reaction chambers and separator not shown in FIG. 4).

According to another embodiment of the present invention, system 300 further comprises a product separation stage 370 configured to receive products from hydrocracking and isomerization stage 350 and separate the products into diesel fuel, gasoline, and/or aviation/jet fuel. System 300 further comprises a separator 375 comprising more than one separation stage to separate hydrogen from hydrocracking isomerization stage 350 effluent for recycle back to hydrocracking isomerization stage 350.

Figure 5:
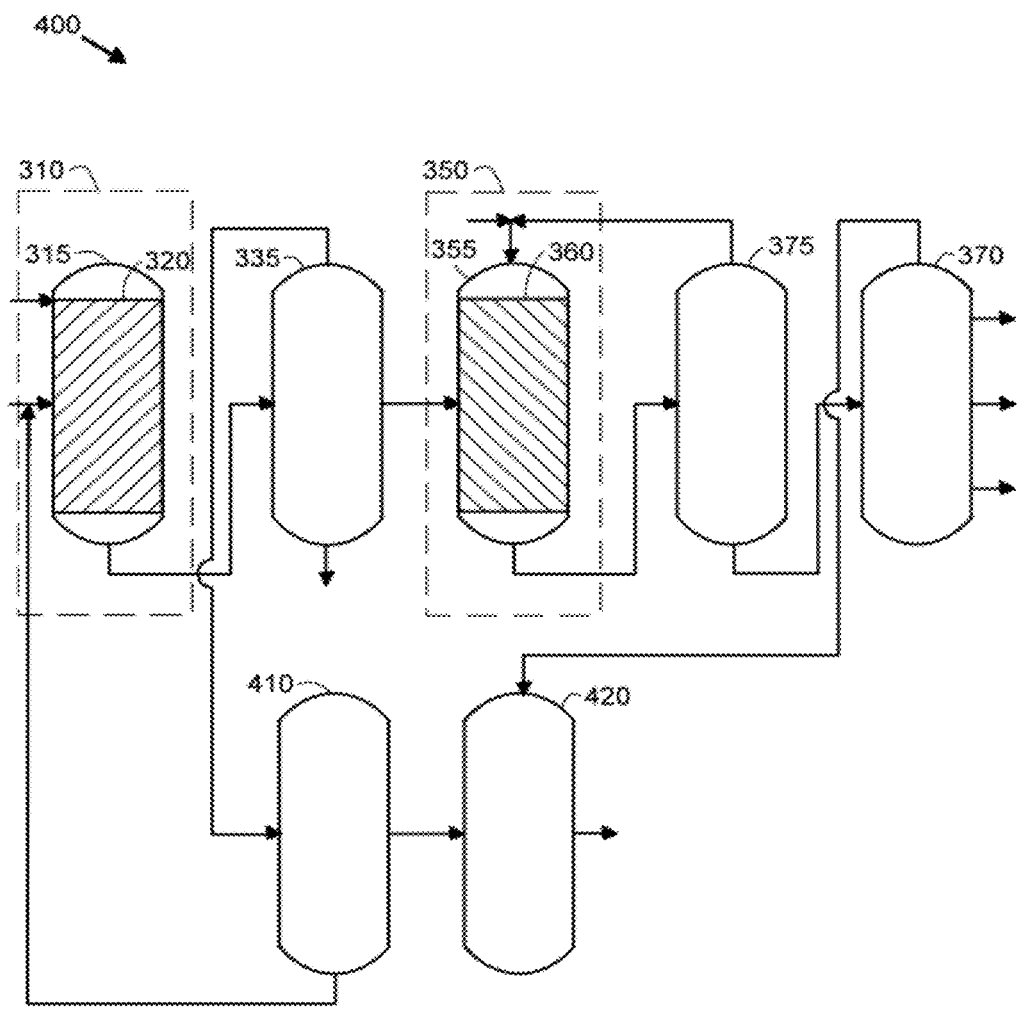
FIG. 5 is a flow diagram according to one or more embodiments of the present invention.

Reference is now made to FIG. 5 where there is shown a system 400 for producing fuel from feedstocks such as renewable feedstocks such as, but not limited to, bio-oils and other oxygenated hydrocarbons. System 400 comprises a deoxygenation stage 310, a three-phase separator 335, a hydrocracking and isomerization stage 350, a product separation stage 370, and a separator 375 all substantially the same and configured as described above for system 300. System 400 further comprises a separator 410 configured to receive the gases from three phase separator 335 and to separate hydrogen from carbon monoxide, carbon dioxide, and light gases. Separator 410 is connected to provide hydrogen to deoxygenation stage 310 or to hydrocracking stage 350. System 400 further comprises a steam reformer and water gas shift stage 420 connected so as to receive carbon monoxide, $CO_2$, and light gases from separator 410 and light gases from product separation stage 370. Steam reformer and water gas shift stage 420 produces hydrogen from the gases that it receives using water gas shift reactions and/or reformer and provides the hydrogen to deoxygenation stage 310 and/or hydrocracking and isomerization stage 350.

According to another embodiment of the present invention, system 400 comprises a three-phase separator 335 configured to receive effluent from the deoxygenation stage and to separate water, liquid hydrocarbons, and gases from the effluent into separate streams; and a second separator 410 and reformer/shift stage 420 to produce hydrogen from the carbon monoxide and the light gases.

In one or more alternative embodiments of systems according to the present invention, the deoxygenation stage comprises two or more deoxygenation reactor chambers connected in series and a separator to remove carbon monoxide, carbon dioxide, water, and light gases from the stream between the two or more deoxygenation reaction chambers. Another separator is used to separate hydrogen from the carbon monoxide, the carbon dioxide, and light gases. A reformer/shift reactor is included to produce hydrogen from the carbon monoxide and the light gases.

According to one or more embodiments of the present invention, a basic process is to deoxygenate the naturally occurring, nonedible bio-oils or algae oil to produce corresponding alkanes and further treat them to produce specification biofuels. The treatment process involves hydrocracking and isomerization. One or more embodiments of the present invention include a two-stage process wherein the first process involves deoxygenating the oil using catalysts and operating conditions according to one or more embodiments of the present invention to suppress water formation. The second stage of the process comprises hydroprocessing of the first stage product in a second stage reactor.

The total gas and liquid mixture from the first stage reactor is cooled and flashed to remove the gases and light liquid products, if any. The three-phase separator also removes any water produced in the first stage deoxygenation reactor to avoid degradation of the second stage catalyst.

The hydrogen feed gas in the first-stage reactor is operated in once-through mode. The gas mixture from the three-phase separator will contain large amounts of CO and hydrogen besides $CO_2$ and other light hydrocarbon product gases. The ratio of CO to $CO_2$ from the first-stage product gas mixture is significantly higher than reported in literature by others.

Thus, as an option for one or more embodiments of the present invention, this gas mixture can used as a source for hydrogen generation or used to produce the needed process heat.

Optionally, the product gas from the first stage after removal of water and other heavy condensable (if any), can be further processed to separate hydrogen from CO, $CO_2$, and light hydrocarbons. The recovered hydrogen can then be returned to the reactor. The stream containing some hydrogen, CO, $CO_2$, and light hydrocarbon gases can be made to go through steam reforming and water-gas-shift reactions to produce hydrogen which can be used as make-up to both the first and the second stage reactors. If desired, the light hydrocarbon gas stream can be supplemented by addition of some light liquid products from the process so as to meet the total requirement of make-up hydrogen for the process. Another option would be to use the separated CO, $CO_2$, and light hydrocarbon gas stream for combustion in a furnace to provide the necessary process heat to the unit. In this mode of operation, a single recycle gas stream and one recycled gas compressor can be used for both stages for further simplification of the overall flow scheme.

The liquid product from the first-stage deoxygenation reactor will be primarily a mixture of straight chain normal paraffins with a low melting point. These are mixed with a fresh stream of recycle hydrogen and passed through another fixed bed reactor to conduct isomerization and mild hydrocracking reactions. Product from the second-stage reactor will have hydrocarbon components that boil in the gasoline, jet, and diesel range temperatures. A suitable commercially available hydroprocessing catalyst that provides these functions is housed in the second-stage reactor.

According to one or more embodiments of the present invention, the first-stage deoxygenation reactor used deoxygenation catalyst according to one or more embodiments of the present invention made by processes according to one or more embodiments of the present invention. The deoxygenation process uses process conditions according to one or more embodiments of the present invention.

Liquid product from the first-stage conversion, according to one or more embodiments of the present invention, was analyzed using GC/MS and a trace for the liquid product from deoxygenation of Camelina oil is shown in FIG. 1-3. The GC trace showed that the paraffinic product primarily contained paraffins with chain length that is one carbon less than the original fatty acid composition when compared with FIG. 1-2. The results indicate that liquid product is primarily paraffinic product and also indicate that deoxygenation is mostly achieved through production of CO and $CO_2$ rather than water.

The ratio of odd to even number carbon species in the liquid product from the first stage is an indicator of the predominant mechanism for deoxygenation: decarbonylation, decarboxylation, or hydrodeoxygenation. The higher ratio indicates that the more predominant mechanism is the decarbonylation or decarboxylation mechanism (producing oxides of carbon rather than water). Experimental results for embodiments of the present invention show this ratio is about 6 in the liquid product; however, in other deoxygenation technologies, the ratio is typically less than 1. A low ratio is an indication that large quantities of water are produced by hydrodeoxygenation and the process consumes large quantities of hydrogen.

The ratio of CO to $CO_2$ obtained using deoxygenation catalyst and processes according to one or more embodiments of the present invention is approximately 6, which indicates that deoxygenation for embodiments of the present invention is primarily as decarbonylation. For other deoxygenation technologies, the ratio of CO to $CO_2$ is from 0 to 2. The higher CO content in the gas product mixture has advantages for use as fuel and for hydrogen generation.

Hydroprocessing units and associated catalysts according to one or more embodiments of the present invention are unique at least in part because of their capability to selectively convert different types of bio-oils into aviation and other transportation fuels with performance characteristics comparable to conventional petroleum based products. Long chain alkanes resulting from deoxygenation of oils can be cracked in the presence of hydrogen and catalysts to produce bio-jet fuel (boiling temperature range 118-314° C.) and bio-diesel fuel (boiling temperature range 262-407° C.). Furthermore, the alkane chain can be isomerized to produce branched hydrocarbons. With the appropriate commercial hydroprocessing catalyst, the product can be customized by controlling the degree of cracking and isomerization to produce "designer" bio-jet and bio-diesel fuels with specific desirable properties.

One embodiment of the present invention is a process to produce diesel and aviation fuels from renewable bio-feedstocks. The specific bio-feedstocks are vegetable oils and cellulose-derived bio-oils. Pyrolysis, liquefaction, or microbial means can be used to produce bio-oils from cellulosic materials like wood chips, farm residues, or municipal waste.

Whether it is crop oil or an oil derived from cellulosic material, the oil should pass though a pre-treating step to rid it of contaminants and potential catalyst poisons. In the case of crop oils, the pre-treating step may only consist of acid washing steps and treatment with an ion exchange material. In the case of oil derived from cellulosic feedstocks, extensive pre-treatment steps are needed to improve their processibility. They should undergo significant upgrading to remove contaminants and to improve stability.

These oils, whether derived from crop oils or cellulosic bio-oils, consist of oxygen in significant amounts in addition to carbon and hydrogen in their constituent molecule. The process described here consists of steps to remove this oxygen. In the case of crop oils, once the oxygen is removed and the triglyceride backbone is broken, the resultant molecule is a straight-chain paraffin. The paraffin is further subjected to additional processing steps to yield a bio-fuel to meet all the specifications of transportation fuels.

The process to convert renewable feedstocks like crop oils, therefore, consists of two process steps: oxygen removal and isomerization/mild cracking to produce the final biofuel product.

The first step consists of breaking the triglyride backbone, hydrogenating to saturate the molecule, and removing oxygen (deoxygenation) from the oil molecule. The deoxygenation is a catalytic reaction in the presence of a catalyst and hydrogen. Hydrogen is a reactant. The catalyst is loaded into a continuous flow fixed bed reactor. Hydrogen gas and the bio-oil feedstock are mixed together ahead of the reactor, heated to reaction temperature in a feed furnace, and reacted in the continuous flow fixed bed reactor. A catalyst, such as that according to one or more embodiments of the present invention, is loaded into the reactor and preferentially removes oxygen by decarbonylation and decarboxylation rather than hydrodeoxygenation. Decarbonylation produces carbon monoxide, decarboxylation produces carbon dioxide, and hydrodeoxygenation produces water. It is preferable to remove oxygen by decarbonylation or decarboxylation rather than by hydrodeoxygenation. Hydrodeoxygenation consumes higher amounts of hydrogen. Higher hydrogen consumption adversely affects the process economics.

Higher hydrogen consumption in the reactor also releases heat which has to be removed for temperature control in the reactor. This would require special design of reactor internals, adding to the cost and complexity of the process. Cold hydrogen gas is used to quench the reaction/product mixture between catalyst beds in a multi-bed reactor. Higher water generation in the reactor also can cause damage to the integrity and mechanical strength of the catalyst under certain situations.

Catalyst according to one or more embodiments of the present invention used in the process preferentially removes oxygen by decarboxylation and decarbonylation mechanism than by hydrodeoxygenation mechanism thereby producing CO and $CO_2$ rather than water. Table 2 shows results from a typical run:

TABLE 2

| PARAMETER | | |
|---|---|---|
| Temperature (° C.) | 380 | 380 |
| Pressure (psig) | 500 | 500 |
| WHSV (1/hr) | 2.5 | 0.82 |
| Hydrogen Feed (SCFB) | 2878 | 9582 |
| PRODUCTS | | |
| $CO/CO_2$ (wt %) | 8.78 | 9.96 |
| Water (wt %) | 2.57 | 2.79 |
| Whole Liquid Product (wt %) | 88.65 | 87.25 |
| Deoxygenation (wt %) | 80.2 | 90.6 |

The total gas and liquid mixture from the reactor is cooled and flashed to remove the gases and light liquid products, if any. The liquid product will be primarily a mixture of straight chain normal paraffins with a low melting point. These are mixed with a fresh stream of recycle hydrogen and passed through another fixed bed reactor to conduct isomerization and mild hydrocracking reactions. A suitable catalyst that provides these functions is housed in this reactor. Product from this reactor will have hydrocarbon components that boil in the gasoline, jet, and diesel range temperatures.

In isomerization and mild hydrocracking, the normal paraffins of 15 to 23 carbon atoms undergo cracking and branching in the presence of hydrogen. These types of reactions allow conversion of normal paraffins to specification fuels boiling predominantly in the diesel and jet boiling range.

The gas-liquid mixture of the second-stage reactor effluent is flashed and the gaseous mixture which contains mostly hydrogen-rich gas is cleaned and recycled to the front end of the reactor for reuse. Hydrogen consumed in both first and second state reactors is replenished by the addition of make-up hydrogen.

The liquid stream separated from the gas stream is distilled to yield the required jet and diesel fuel in addition to other light liquid and gases which are disposed of or used as in any conventional refinery. The light liquid products can be light paraffins that result from mild hydrocracking that occurs in the second-stage reactor.

The process produces hydrocarbon liquid to meet all the required specifications of diesel and aviation fuels. The yield of jet and diesel product per unit feed oil is maximized with lower production of lighter hydrocarbons in the process. With less light hydrocarbons and less water made in the process, the overall hydrogen make-up requirement will be less. Hydrogen is a reactant in the process to convert bio-feedstocks to specification biofuels. Hydrogen consumption levels have significant impact on the economics of the overall process.

The recycle hydrogen gas from the first stage can be operated in once-through mode. The once-through recycle hydrogen gas will contain large amounts of CO and hydrogen besides $CO_2$ and other light hydrocarbon product gases. This gas mixture can be a good source for hydrogen generation or to produce the needed process heat. Optionally, the unit can be operated in recycle gas mode by continuously removing CO, $CO_2$, and some light gases from a separation unit downstream of the three-phase separator. The CO and the light gases can be used to produce the necessary hydrogen for the process through steam reforming and water gas shift reactions.

Also, other bio-feedstocks like cellulose (wood chips, corn stover, farm residues, etc.) can be used to produce hydrogen. These bio-feedstocks are steam reformed in a separate unit to produce hydrogen. Steam reforming (gasification) produces production gas which consists of mostly hydrogen and oxides of carbon besides many contaminants. The gas has to be cleaned before it can undergo water-gas shift reaction to produce hydrogen which can then be used in the process to convert crop oils and other bio-oils to specification biofuels.

One or more embodiments of the present invention comprise using at least one crop oil such as, but not limited to, algae or microbial oil, canola oil, corn oil, jatropha oil, camelina oil, rapeseed oil, pall oil, and combinations thereof.

One or more embodiments of the present invention further include the options of co-feeding or mixing with a component derived from fossil fuels, depolymerization of waste plastics, thermal, chemical, or catalytic, or synthetic oils derived from petrochemical or chemical processes.

One or more embodiments of the present invention further include generating a gas stream that can be used to generate the process heat necessary in a substantially high-temperature conversion process. This embodiment further improves the process economics.

Example 7

Jet/Aviation Fuel Synthesis from Bio-Oils Using Nanocoated Palladium on Activated Carbon Deoxygenation Catalyst Refined Camelina oil was the feedstock used in a deoxygenation reactor according to one or more embodiments of the present invention. Deoxygenation experiments were carried out in a continuous down-flow multiphase packed bed. Eleven grams of 1.72 wt % nanocoated Pd on activated carbon catalyst according to one or more embodiments of the present invention was loaded into a stainless steel reactor.

The reactor was 0.305 inches in internal diameter and 18 inches long with pre-heat and post-heat zones. The reactor volume was 22 cubic centimeters. Heat for the reactor was supplied by a three-zone controlled furnace with heat equalizing blocks. The Camelina oil feed rate into the reactor was 0.1 cc/min. Liquid and gaseous products exiting the reactor were collected in a separator. Backpressure regulators maintained the operating system pressure at 1000 psig.

The catalyst was reduced under hydrogen at 250° C. for 2 hours first. Reactor temperature was raised from 250° C. to 360° C. within 60 minutes. Liquid Camelina oil was pumped into the reactor at a rate of 0.1 cc/min. Hydrogen gas feed rate into the reactor was 135 cc/min. Reactor temperature was maintained at 360° C. and the reactor was run for 24 hours. Reactor gas product was analyzed using a GC. The major reactant gaseous product observed other than $H_2$ was CO. Paraffinic wax product was collected and separated from water by gravity.

Paraffinic wax from the deoxygenation reactor was fed to an isomerization/cracking reactor. The isomerization and hydrocracking reactor used a commercially available standard catalyst. The paraffinic wax feed line was maintained at 40° C. to ensure that wax was properly pumped into the isomerization/cracking reactor. The isomerization/cracking experiment was carried out in a continuous down-flow multiphase packed bed reactor. Commercially available isomerization catalyst totaling 3.8 grams was loaded into the stainless steel reactor.

The reactor was a 0.305 inch internal diameter and 5 inch long reactor with pre-heat and post-heat zones. The reactor volume was 6 cc. Heat for the reactor was supplied by a three-zone controlled furnace with heat equalizing blocks. A pump was used to pump the paraffinic wax feed at 0.1 cc/min rate into the reactor. Liquid and gaseous products exiting the reactor were collected in a separator. Backpressure regulators maintained operating system pressure at 1000 psig. The isomerization/cracking catalyst was reduced under hydrogen at 260° C. for 2 hours first. Reactor temperature was lowered to 232° C. Liquid paraffinic feed was then pumped into the reactor at a 0.1 cc/min rate. Hydrogen gas feed rate into the reactor was 83 cc/min. Reactor temperature was raised to and maintained at 360° C. and the reactor was run for 20 hours. The whole liquid product was collected from the reactor and analyzed using simulated distillation D-2887. The simulated distillation analysis showed 80% by volume of jet fuel in the boiling range of 244F-597F was produced.

Example 8

Diesel Fuel Synthesis from Bio-Oils Using Nanocoated Palladium on Activated Carbon Deoxygenation Catalyst Refined Camelina oil was the feedstock used in a deoxygenation reactor according to one or more embodiments of the present invention. Deoxygenation experiments were carried out in a continuous down-flow multiphase packed bed reactor. Eleven grams of 1.72 wt % nanocoated Pd on activated carbon catalyst according to one or more embodiments of the present invention was loaded into a stainless steel reactor. The reactor was a 0.305 inch internal diameter and 18 inch long reactor with pre-heat and post-heat zones. The reactor volume was 22 cc. Heat for the reactor was supplied by a three-zone controlled furnace with heat equalizing blocks. A pump was used to pump the Camelina oil feed at 0.1 cc/min into the reactor. Liquid and gaseous products exiting the reactor were collected in a separator. Backpressure regulators maintained operating system pressure at 1000 psig.

The catalyst was reduced under hydrogen at 250° C. for 2 hours. Reactor temperature was raised from 250° C. to 360° C. within 60 minutes. Liquid Camelina oil was pumped into the reactor at a 0.1 cc/min rate. Hydrogen gas feed rate into the reactor was 135 cc/min. Reactor temperature was maintained at 360° C. and the reactor was run for 24 hours. Reactor gas product was analyzed using a GC. The major reactant gaseous product observed other than $H_2$ was CO. Paraffinic wax product was collected and separated from water by gravity.

Paraffinic wax from the deoxygenation reactor was fed to an isomerization/cracking reactor. The paraffinic wax feed line was maintained at 40° C. to ensure that wax was properly pumped into the isomerization/cracking reactor. The isomerization/cracking experiment was carried out in a continuous down-flow multiphase packed bed reactor. Commercially available isomerization catalyst totaling 3.8 grams was loaded into the stainless steel reactor.

The reactor was 0.305 inches in internal diameter and 5 inches long with pre-heat and post-heat zones. The reactor volume was 6 cc. Heat for the reactor was supplied by a three-zone controlled furnace with heat equalizing blocks. A pump was used to pump the paraffinic wax feed at 0.1 cc/min into the reactor. Liquid and gaseous products exiting the reactor were collected in a separator. Backpressure regulators maintained operating system pressure at 1000 psig. The isomerization/cracking catalyst was reduced under hydrogen at 260° C. for 2 hours. Reactor temperature was lowered to 232° C. Liquid paraffinic feed was then pumped into the reactor at a 0.1 cc/min rate. Hydrogen gas feed rate into the reactor was 83 cc/min. Reactor temperature was raised to and maintained at 325° C. and the reactor was run for 20 hours. The whole liquid product was collected from the reactor and analyzed using simulated distillation D-2887. The simulated distillation analysis showed 84% by volume of diesel fuel in the boiling range of 504F-765F was produced.

Methods according to one or more embodiments of the present invention may also comprise depositing palladium to make palladium membranes for hydrogen separation. Methods according to one or more embodiments of the present invention may also comprise depositing palladium and/or other metals nanoscale coatings on zeolites, alumina, or silica-alumina substrates to make catalyst for hydrocracking applications of hydrocarbon fuels.

In the foregoing specification, the invention has been described with reference to specific embodiments; however, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention.

Benefits, other advantages, and solutions to problems have been described above with regard to specific embodiments; however, the benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," "includes," "including," "has," "having," "at least one of," or any other variation thereof, are intended to cover a non-exclusive inclusion. For example, a process, method, article, or apparatus that comprises a list of elements is not necessarily limited only to those elements, but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A method of making a catalyst, the method comprising:
   providing a granular or pelletized porous substrate;
   providing a solution comprising ions of a metal for electroless deposition;
   mixing the substrate with the solution; and
   controlling the temperature of the mixture of the substrate and the solution to ramp from a first temperature to a higher temperature while adding a reducing agent incrementally or continuously so as to cause controlled electroless deposition of the metal as a catalytically active nanoscale coating of the substrate.

2. The method of claim 1, wherein the substrate is structured and comprises carbon, carbon foam, alumina, silica-alumina, metal foam, silica, zeolites, magnesia, titania, chromia, zirconia, monoliths, or combinations thereof.

3. The method of claim 1, wherein the substrate is granular with size in the range of 0.5 mm to 3 mm, the substrate comprises activated carbon, alumina, silica-alumina, silica, zeolites, titania, zirconia, magnesia, chromia, or combinations thereof.

4. The method of claim 1, wherein the metal comprises palladium.

5. The method of claim 1, wherein the metal comprises nickel.

6. The method claim 1, wherein the metal comprises chromium, molybdenum, tungsten, iron, ruthenium, osmium, cobalt, rhodium, iridium, platinum, zinc, copper, gold, silver, or mixtures thereof.

7. The method claim 1, wherein two or more metals are electrolessly deposited by co-deposition or sequential deposition.

8. The method of claim 1, wherein the substrate is activated carbon and the metal comprises palladium.

9. The method of claim 1, wherein the reducing agent comprises hydrazine, aldehydes, carboxylic acids with up to six carbons, or mixtures thereof.

10. The method of claim 1, wherein the granular or pelletized porous substrate is in the size range of 0.5 mm to 3 mm.

11. The method of claim 1, further comprising activating the substrate prior to electroless deposition.

12. The method of claim 1, further comprising sensitizing the substrate prior to electroless deposition by exposing the substrate to a sensitizing solution.

13. The method of claim 1, further comprising sensitizing the substrate prior to electroless deposition by exposing the substrate to a solution comprising a dissolved metal.

14. The method of claim 1, further comprising sensitizing the substrate prior to electroless deposition by exposing the substrate to a tin chloride solution and/or activating the substrates by exposing the substrate to a palladium chloride solution.

15. The method of claim 1, wherein the substrate comprises activated carbon, carbon foam, alumina, metal foam, silica-alumina, silica, zeolites, titania, zirconia, magnesia, chromia, monoliths, or combinations thereof; the metal comprises chromium, molybdenum, tungsten, iron, ruthenium, osmium, cobalt, rhodium, iridium, nickel, palladium, platinum, zinc, copper, gold, silver or mixtures thereof; the reducing agent comprises hydrazine, aldehydes, carboxylic acids having 1-6 carbon atoms, or mixtures thereof.

16. A method of making a catalyst, the method comprising:
providing a substrate comprising granular activated carbon;
exposing the substrate to a tin chloride solution so as to sensitize the activated carbon for electroless deposition;
exposing the substrate to a palladium chloride solution so as to activate the activated carbon for electroless deposition;
providing a solution of palladium for electroless deposition;
mixing the substrate with the solution; and
controlling the temperature of the mixture of the substrate and the solution
to ramp from a first temperature to a higher temperature while adding hydrazine incrementally or continuously so as to cause controlled electroless deposition of the palladium as a catalytically active nanoscale coating of the activated carbon.

17. The method of claim 16, wherein the hydrazine is added continuously.

18. The method of claim 16, further comprising an acid wash of the activated carbon.

19. A method of making a catalyst, the method comprising:
providing a substrate comprising granular activated carbon;
exposing the activated carbon to a tin chloride solution so as to sensitize the activated carbon for electroless deposition;
exposing the activated carbon to a palladium chloride solution so as to activate the activated carbon for electroless deposition;
providing a solution of nickel for electroless deposition;
mixing the activated carbon with the solution; and
controlling the temperature of the mixture of the activated carbon and the solution to ramp from a first temperature to a higher temperature while adding hydrazine incrementally or continuously to the mixture so as to cause controlled electroless deposition of the nickel as a catalytically active nanoscale coating of the activated carbon.

20. The method of claim 19, wherein the hydrazine is added continuously.

21. The method of claim 19, further comprising an acid wash of the activated carbon.

22. A catalyst made by the method of claim 1.

* * * * *